United States Patent
Heyne et al.

(10) Patent No.: US 12,422,731 B2
(45) Date of Patent: Sep. 23, 2025

(54) METHOD AND ARRANGEMENT FOR GENERATING A SUPERCONTINUUM BY A GHOST PULSE

(71) Applicant: FREIE UNIVERSITÄT BERLIN, Berlin (DE)

(72) Inventors: Karsten Heyne, Beelitz (DE); Valeri Kozich, Berlin (DE); Xingwen Zhang, ShenZhen (CN)

(73) Assignee: FREIE UNIVERSITÄT BERLIN, Berlin (DE)

( * ) Notice: Subject to any disclaimer, the term of this patent is extended or adjusted under 35 U.S.C. 154(b) by 122 days.

(21) Appl. No.: 18/266,760

(22) PCT Filed: Dec. 9, 2021

(86) PCT No.: PCT/EP2021/085053
§ 371 (c)(1),
(2) Date: Jun. 12, 2023

(87) PCT Pub. No.: WO2022/122956
PCT Pub. Date: Jun. 16, 2022

(65) Prior Publication Data
US 2024/0045304 A1    Feb. 8, 2024

(30) Foreign Application Priority Data

Dec. 11, 2020   (EP) .................................. 20213444

(51) Int. Cl.
*G02F 1/35* (2006.01)
(52) U.S. Cl.
CPC .......... *G02F 1/3528* (2021.01); *G02F 1/3507* (2021.01); *G02F 1/3511* (2013.01)

(58) Field of Classification Search
CPC ..... G02F 1/3528; G02F 1/3507; G02F 1/3511
See application file for complete search history.

(56) References Cited

U.S. PATENT DOCUMENTS

| 6,813,429 B2 | 11/2004 | Price et al. |
| 8,385,699 B2 * | 2/2013 | Liu ................... G02B 6/02214 359/341.1 |

(Continued)

OTHER PUBLICATIONS

Vasa et al., "Supercontinuum generation in water by intense, femotosecond laser pulses under anomalous chromatic dispersion," Phys. Rev., vol. 89, Issue 4, Apr. 2014, pp. 043834-1 to 043834-6. (Year: 2014).*

(Continued)

*Primary Examiner* — Rhonda S Peace
(74) *Attorney, Agent, or Firm* — Maschoff Brennan

(57) ABSTRACT

It is provided a method for generating a supercontinuum, the method comprising the following steps: a) radiating a carrier laser pulse having a first temporal width onto a first non-linear material; b) at the same time, radiating a second shorter laser pulse having a second temporal width onto the first non-linear material, thereby changing the non-linear properties of the first non-linear material and imprinting a ghost pulse having a third temporal width into the carrier pulse; the second temporal width being at least two times shorter than the first temporal width, and c) radiating the carrier pulse with imprinted ghost pulse onto the first non-linear material or a second non-linear material and generating, by self-phase modulating, a supercontinuum around the center frequency of the carrier pulse.

15 Claims, 11 Drawing Sheets

(56) References Cited

U.S. PATENT DOCUMENTS

| | | |
|---|---|---|
| 9,341,920 B1 | 5/2016 | Reed et al. |
| 2004/0032580 A1* | 2/2004 | Piche ................. G01J 11/00 356/121 |
| 2012/0027031 A1 | 2/2012 | Liu |
| 2014/0231679 A1* | 8/2014 | Kremeyer ........... H05H 1/0012 378/145 |
| 2024/0045304 A1* | 2/2024 | Heyne ................. G02F 1/35 |

OTHER PUBLICATIONS

Alfano, R.R., et al., "The Supercontinuum Laser Source. The Ultimate White Light. 3rd ed.," Springer, Dec. 1, 2016.

Dubietis et al. "Ultrafast supercontinuum generation in bulk condensed media (Invited Review)" Jun. 2017. arXiv:1706.04356.

Marcinkevičiūtė et al. "Supercontinuum generation in the absence and in the presence of color centers in NaCl and KBr" Results in Physics vol. 14, Sep. 2019, 102396.

Dubietis et al. "Supercontinuum generation: introduction" Journal of the Optical Society of America B vol. 36, Issue 2, pp. SG1-SG3 (2019) • https://doi.org/10.1364/JOSAB.36.000SG1.

\* cited by examiner

METHOD AND ARRANGEMENT FOR GENERATING A SUPERCONTINUUM BY A GHOST PULSE

CROSS-REFERENCE TO A RELATED APPLICATION

This application is a National Phase Patent Application of International Patent Application Number PCT/EP2021/085053, filed on Dec. 9, 2021, which claims priority of European Patent Application Number 20 213 444.1, filed on Dec. 1, 2020.

BACKGROUND

The disclosure relates to a method for generating a supercontinuum and to an arrangement for generating a supercontinuum.

Generation of ultrashort laser pulses, such as femtosecond ($10^{-15}$ s) laser pulses, are mainly based on non-linear optical processes. Essential is the spectral broadening and the generation of new frequency components induced by the interaction of an ultrashort laser pulse with a non-linear material. These effects have been studied since the 1960s and are described in detail by Alfano (Robert R. Alfano: "The Supercontinuum Laser Source—The Ultimate White Light"; Third Edition; Springer; New York, Heidelberg, Dordrecht, London; 2016). Supercontinuum generation has become a central part of ultrafast systems and ultrafast experimental setups.

U.S. Pat. No. 6,813,429 B2 describes a completely different method, namely, a process for amplifying a laser pulse to generate solitons. Solitons are self-reinforcing wave packets that propagate at a constant velocity and maintain their shape while propagating. Solitons are caused by a cancellation of nonlinear and dispersive effects in a gain medium. For soliton generation, U.S. Pat. No. 6,813,429 B2 makes use of an optical source operable to generate ultrashort optical pulses at a first wavelength and an optical fiber amplifier comprising an optical fiber having a core containing a dopant to provide optical gain at the first wavelength and anomalous dispersion over a wavelength range including the first wavelength and a second wavelength. The optical fiber receives the ultrashort optical pulses, amplifies the ultrashort optical pulses, and alters the wavelength of the ultrashort optical pulses to at least the second wavelength by the soliton-self-frequency shifting effect. Thus, the teaching of this US patent requires specifically structured fibers and takes advantage of an amplifying process.

Supercontinuum generation and generation of new frequency components are originated in a process called self-phase modulation (SPM). This is also well explained in the precedingly mentioned book of Alfano.

With a generalized coordinate $z'=z+ct/n_0$, wherein
z is the propagation direction of a light pulse,
c is the velocity of light,
t is time, and
$n_0$ is the index of refraction of the material in which the light pulse travels,
one obtains a differential equation for the phase of the light pulse $\Phi(z')$:

$$\frac{\partial \Phi(z')}{\partial z'} = \frac{2\pi n_0 \omega_0}{c} \chi^{(3)} |E(t)|^2 \qquad \text{Equation 1}$$

Thereby,
$\omega_0$ is the center frequency of the short light pulse,
E(t) is the electric field amplitude, and
$\chi^{(3)}$ is the third-order susceptibility tensor.

The third-order susceptibility tensor is responsible for SPM, Kerr-effect, third-harmonic generation, and four-wave mixing. In contrast, the second-order susceptibility tensor $\chi^{(2)}$ is responsible for sum-frequency generation, second-harmonic generation, and difference-frequency generation.

The frequency $\omega$ is given by:

$$\omega = \omega_0 + \frac{\partial}{\partial t} \Delta\Phi(z') \qquad \text{Equation 2}$$

By combining equation 1 and equation 2, the following equation 3 results:

$$\omega - \omega_0 = \frac{\partial}{\partial t} \Delta\Phi(z') = \frac{\partial}{\partial t} \frac{n_2 \omega_0 n_0^2}{c} |E(t)|^2 z' = \frac{\omega_0 n_0^2}{c} z' \frac{\partial}{\partial t} \delta n \qquad \text{Equation 3}$$

The term $\delta n = n_2 |E(t)|^2$ indicates that new frequencies will be generated if the time derivative of $\delta n$ is significant. This is the case if the intensity change of the electric field E(t) is very strong. The new frequencies w generated differ from the center frequency $\omega_0$ by $\Delta\omega$:

$$\Delta\omega = \omega_0 - \omega = -\omega_0 n_0^2 \frac{t}{c} \frac{\partial \delta n}{\partial t} \propto -z n_{NL} \frac{\partial I}{\partial t} \qquad \text{Equation 4}$$

The new frequencies are proportional to the non-linear index of refraction, the interaction length z in the medium, and most important the (negative) derivative of the intensity over time.

FIG. 1A depicts how such a femtosecond laser pulse interacting with a non-linear material generates new frequencies. At the leading edge of the pulse (at around 50 fs), lower frequencies than $\omega_0$ can be observed. At the tailing edge of the pulse (at around 120 fs), higher frequencies than $\omega_0$ can be observed. Since the new generated frequencies show a broader spectrum, this spectrum is called supercontinuum. The frequencies of lower energy are generated earlier than the frequencies of higher energy resulting in a positively chirped spectrum (red wavelengths occur before the bluer wavelengths). From these fundamentals, a general statement can be concluded: frequencies generated by SPM are positively chirped or, expressed in other words, a generated supercontinuum is positively chirped.

There are many optical set-ups to compress positive chirped pulses with broad (~100 cm$^{-1}$) and ultrabroad spectra (>500 cm$^{-1}$). In the visible spectral region from UV (around 200 nm) to the near infrared (NIR) range (around 1500 nm), all transparent optical materials used for optical components imprint also a positive chirp onto a light pulse travelling through these media, because they have normal dispersion. Thus, the positive chirp and the temporal length of the supercontinuum pulse is increased by optical components. Only reflective optics leave the chirp unchanged. If a positively chirped supercontinuum exhibits a further positive chirp by travelling through optical materials, the overall pulse length of supercontinuum pulse is increased.

The supercontinuum generated by a femtosecond laser pulse with center frequency $\omega_2$ interacting with a non-linear material is located around the center frequency $\omega_2$, typically with decreasing intensity with increasing frequency difference to $\omega_2$. The spectral bandwidth of a supercontinuum around $\omega_2$ in the visible spectral region has a typical width of about $\pm 0.7*(c/\omega_2)$, with c being the velocity of light. This limits many spectroscopic experiments, where a supercontinuum around $\omega_1$ is needed, but only femtosecond pulses around $\omega_2$ are available. A transfer of the center of the supercontinuum to $\omega_1$ would be desirable, but it is known from prior art that this is not possible without a femtosecond laser pulse at a frequency around $\omega_1$.

SUMMARY

However, it would be desirable to generate supercontinuum pulses that do not experience an increase of the pulse length by travelling through normal dispersive material, i.e. that are not temporarily broadened. Therefore, it is an object underlying the proposed solution to provide a method and an arrangement for generating supercontinuum pulses that can exhibit shorter temporal widths and/or a broader spectral width than supercontinuum pulses known from prior art.

Moreover, it would be desirable to transfer the center of the supercontinuum frequency to $\omega_1$ without using a femtosecond laser having a center frequency at $\omega_1$. Therefore, it is a further object underlying the proposed solution to provide a method and an arrangement for generating a supercontinuum around the center frequency $\omega_1$.

This object is achieved with a method having features as described herein as well as with an arrangement having features as described herein.

Such a method is appropriate for generating a supercontinuum having a negative chirp, and can transfer the center of the supercontinuum frequency to the frequency $\omega_1$ of the carrier pulse. It comprises the steps explained in the following.

In one step, a carrier laser pulse having a first temporal width ($\Delta\tau_1$) and frequency $\omega_1$ is radiated onto a first non-linear material.

At the same time, a second shorter laser pulse having a second temporal width ($\Delta\tau_2$) and a frequency $\omega_2$ is radiated onto the first non-linear material, thereby changing non-linear properties of the first non-linear material and imprinting a ghost pulse having a third temporal width ($\Delta\tau_3$) into the carrier pulse. In this context, the second temporal width ($\Delta\tau_2$) is at least two times shorter than the first temporal width ($\Delta\tau_1$).

Afterwards, the carrier pulse with imprinted ghost pulse is radiated onto the first non-linear material or onto a second non-linear material generating a supercontinuum around the center frequency of the carrier pulse. The supercontinuum is generated by self-phase modulating due to the interaction of the ghost pulse with the first or second non-linear material. In particular, the processes in the first and/or the second non-linear material are soliton-free processes, i.e., imprinting the ghost pulse and/or generating the supercontinuum are accomplished without generating a soliton, i.e., in a soliton-free manner. Particularly, the processes in the first and/or the second non-linear material do not comprise any energy amplification of the irradiated laser light.

The second non-linear material can be the same material as the first non-linear material or can be different from the first non-linear material. It should be noted in particular that neither the first non-linear material nor the second non-linear material is or comprises a gain medium. Therefore, they can in particular also be denoted as gain-medium free non-linear materials. Expressed in other words, the first non-linear material and the second non-linear do not amplify energy irradiated onto them. Rather, the first non-linear material serves for reducing the energy of the carrier pulse by introducing a ghost pulse into the carrier pulse. The first or second non-linear material is afterwards used for generating the supercontinuum. Thus, the processes occurring in the first non-linear material according to aspects of the solution are diametrically opposed to the processes according to classic prior art solutions like those described in U.S. Pat. No. 6,813,429 B2 that amplify irradiated laser light with a non-linear gain medium.

During the interaction of the carrier pulse (having a center frequency $\omega_1$) and a femtosecond pulse (having a center frequency $\omega_2$) a so-called ghost pulse is created. This interaction can be a sum-frequency, a difference frequency generation or any other non-linear processes.

Expressed in other words, the interaction of the carrier pulse and the second shorter pulse with the non-linear material, a short-term coherent intensity hole, i.e. the ghost pulse, is introduced into the carrier pulse. Thereby, the ghost pulse exhibits an intensity decrease and a subsequent intensity increase. The shorter pulse has a second temporal width ($\Delta\tau_2$) which is at least two times shorter than the first temporal width ($\Delta\tau_1$).

The ghost pulse is a coherent light pulse with negative intensity. It can occur only together with other electric fields of positive intensity higher or equal to the intensity of the ghost pulse. The occurrence of a ghost pulse together with a carrier pulse is characterized by a part of the carrier pulse in which intensity is missing in a coherent manner (cf. FIG. 2B). This coherent interaction and interference is due to the interaction of the first laser pulse (carrier pulse) at $\omega_1$ and the second shorter laser pulse at $\omega_2$ in the first non-linear material. This interaction creates the properties of the ghost pulse, i.e. intensity, phase, and temporal behavior. The frequency of the ghost pulse overlaps with the frequency of the carrier pulse, and thus an interference between the ghost pulse and the carrier pulse is enabled.

Thus, a ghost pulse is the sharp coherent missing of intensity in the temporal course of a longer light pulse (i.e., the carrier pulse). While physically there is no negative intensity, a ghost pulse can be described mathematically as a real light pulse with negative intensity $I_g(t)=E(t)^2_{ghost}$ and with a phase parameter $\varphi_2$, frequency $\omega_3$, and temporal width ($\Delta\tau_3$). The ghost pulse interferes with a longer light pulse $I_r(t)=E(t)^2_{const}$. The essential property of a ghost pulse is that its intensity is first decreased to a minimum and then increased to zero on a very short time scale $\tau_g$ as compared to the time scale of the longer light pulse $\tau_r$. In contrast, a normal ultrashort light pulse changes first to bigger and afterwards to smaller intensities on a very short time scale.

The frequency spectrum of the ghost pulse around $\omega_3$ is nearly identical to that of the carrier pulse $\omega_1$, but it exhibits a broader spectral width due to its shorter temporal width compared to the mere carrier pulse. Due to the changed temporal property of the carrier pulse by the ghost pulse, the spectral bandwidth of the carrier pulse with imprinted or interfering ghost pulse is increased.

The intensity of the ghost pulse interfering with the carrier pulse starts at $t_0$ with a given intensity $I_{max}=I_r(t_0)$, given by the intensity of the longer carrier pulse at time $t_0$. The intensity of the light field drops abruptly to $I_{min}=I_r(t_{gmax})+I_g(t_{gmax})$ at a time $t_{gmax}$ with the maximal negative intensity of the ghost pulse intensity $I_g(t)$.

To achieve a complete ghost pulse, the intensity rises again to the value of the carrier pulse. Thus, the ghost pulse is the fast negative intensity change within the intensity of a longer pulse, the carrier pulse.

In a more technical approach, aspects of the proposed solution relate to a method for generating non-linear optical effects, in particular supercontinuum generation, by using ghost pulses in the temporal regime defined by the time dependent electric field E(t), wherein t is the time:

$$E(t) = -|A|\frac{\Delta\omega}{\sqrt{\pi}}e^{-\left(\frac{\Delta\omega}{z}\right)^2 t^2}\cos(\omega_3 t + \varphi_2) + |E_1(t)|\cos(\omega_1 t + \varphi_1) \quad \text{Equation 5A}$$

$$E(t) = E(t)_{ghost} + E(t)_{const} \quad \text{Equation 5B}$$

$$env(t) = -|A|\frac{\Delta\omega}{\sqrt{\pi}}e^{-\left(\frac{\Delta\omega}{z}\right)^2 t^3} \quad \text{Equation 5C}$$

The ghost pulse $E(t)_{ghost}$ exhibits a negative field amplitude $-|A|$, $2\Delta\omega$ is the full spectral bandwidth at half maximum of the ghost pulse, $\omega_3$ is the center frequency of the ghost pulse, and $\varphi_2$ the phase of the ghost pulse light field. The env(t) describes the field envelope of the ghost pulse, and has no sinus nor cosinus function. The ghost pulse is embedded in a slower electric field $E(t)_{const}$ with positive field amplitude $E_1$, carrier pulse frequency $\omega_1$ and phase $\varphi_1$. The temporal properties of the ghost pulse $E(t)_{ghost}$ are distinct from that of the quasi constant electric field $E(t)_{const}$. The different temporal properties between $E(t)_{ghost}$ and $E(t)_{const}$ are defined as follows:

The shortest time difference between the minimum of the electric field envelope env(t) of the ghost pulse and the time point with half its value is $\Delta\tau_{ghost}$. The shortest time difference between the maximum of the electric field envelope of the quasi constant pulse and the time point with half its value is $\Delta\tau_{const}$. On the time scale of the ghost pulse, the quasi constant pulse is nearly constant, described by $\Delta\tau_{const} \geq 4 \Delta\tau_{ghost}$.

The temporal properties describe the time dependent change in amplitude and intensity. In particular, the first and second moments of the temporal property describe the distribution of the total integrated amplitude or intensity (see "first and second moment" in Bronshtein, I. N. et al "Handbook of Mathematics", 6th edition 2015, Springer Berlin).

In an embodiment, the negative pulse energy of the ghost pulse (or the missing energy in the carrier pulse, i.e., the pulse energy of the ghost pulse) is (expressed as absolute value) bigger than 10 nJ, in particular bigger than 20 nJ, in particular bigger than 50 nJ, in particular bigger than 100 nJ, in particular bigger than 200 nJ, in particular bigger than 500 nJ, in particular bigger than 1000 nJ, in particular bigger than 2000 nJ, in particular bigger than 5000 nJ, in particular bigger than 10000 nJ, in particular bigger than 0.1 mJ, in particular bigger than 1 mJ. In an embodiment, the negative pulse energy lies in the range between 10 nJ to 100 mJ are in the range that can be built up from any of the precedingly mentioned values of potential lower barriers for the negative pulse energy (e.g. 50 nJ to 0.1 mJ, or 200 nJ to 2000 nJ, etc.). Thereby, the energy of the ghost pulse is the integrated energy of the whole intensity hole or negative pulse intensity. Negative pulse energies bigger than 100 nJ are particularly appropriate to generate suitable ghost pulses with a carrier pulse for negatively chirped supercontinuum generation, for generation of broad spectral light pulses for example in Raman-scattering experiments, for transferring the spectral range of the supercontinuum to new spectral ranges in the UV or mid-infrared, for inducing fast dynamics by the ghost pulse to drive light induced processes in the presence of an oscillating electric field (the carrier field), for changing the properties of plasma interaction or auto-ionization in higher order non-linear processes.

In an embodiment, the first temporal width is defined by a time period ($\Delta\tau_1$) of a full width at half maximum (FWHM) of the carrier pulse.

Alternatively, the first temporal width is defined by a time period of an intensity drop of the carrier pulse to 1/e times a maximum intensity of the carrier pulse.

Alternatively, the first temporal width is defined by the second central moment of a distribution of temporal properties of the carrier pulse (i.e., the variance $\sigma^2$ expressed as the square of the standard deviation $\sigma$).

In an embodiment, the second temporal width is defined by a time period ($\Delta\tau_2$) of a full width at half maximum (FWHM) of the second laser pulse.

Alternatively, the second temporal width is defined by a time period of an intensity drop of the second laser pulse to 1/e times a maximum intensity of the second laser pulse.

Alternatively, the second temporal width is defined by the second central moment of a distribution of temporal properties of the second laser pulse (i.e., the variance $\sigma^2$ expressed as the square of the standard deviation $\sigma$).

In an embodiment, the third temporal width is defined by a time period ($\Delta\tau_3$) of a full width at half maximum (FWHM) of the ghost pulse.

Alternatively, the third temporal width is defined by a time period of an absolute intensity drop of the ghost pulse to 1/e times a maximum absolute intensity of the ghost pulse.

Alternatively, the third temporal width is defined by the second central moment of a distribution of temporal properties of the ghost pulse.

Thereby, the definitions chosen from the first temporal width and the second temporal width typically correspond to each other to allow for good comparison of both temporal widths. E.g., if the time period of the full width at half maximum of the carrier pulse is chosen to define the first temporal width, the time period of the full width at half maximum of the ghost pulse is chosen for the second temporal width. This is also true for the other possible definitions of the temporal width.

The intensity decrease $I_g$ in the carrier field by interference of the ghost pulse with the carrier pulse that changes the temporal profile of the carrier pulse with imprinted ghost pulse is essential to generate the negatively chirped supercontinuum. The third temporal width of the ghost pulse is similar to the second temporal width of the short laser pulse, if the carrier pulse is much longer. The absolute energy of the ghost pulse, or the energy loss in the carrier pulse, is, in an embodiment, greater than 10 nJ.

In an embodiment, the second temporal width (i.e., the temporal width of the second shorter laser pulse being responsible for generating the ghost pulse) is 10 ns or less, in particular 5 ns or less, in particular 2 ns or less, in particular 1 ns or less, in particular 500 ps or less, in particular 200 ps or less, in particular 100 ps or less, in particular 50 ps or less, in particular 20 ps or less, in particular 10 ps or less, in particular 5 ps or less, in particular 2 ps or less, in particular 1 ps or 30 less, in particular 500 fs or less, in particular 200 fs or less, in particular 100 fs or less, in particular 50 fs or less, in particular 20 fs or less, in particular 10 fs or less. Pulses with temporal widths shorter than 1 ps are particularly appropriate to generate the ghost pulse. In an embodiment, the second temporal width lies in the range built up from any of the precedingly mentioned values, e.g., in a range from 10 fs to 10 ns, or a range from 20 fs to 500 fs, etc.).

In an embodiment, a ratio R between the time scale of the carrier pulse (or first temporal width) $\tau_r$ and the time scale of the ghost pulse (or second temporal width) $\tau_g$ ($R=\tau_r/\tau_g$) is between 2 and 1,000,000, in particular between 3 and 500,000, in particular between 5 and 200,000, in particular between 8 and 100,000, in particular between 10 and 50,000, in particular between 20 and 20,000, in particular between 50 and 10,000, in particular between 100 and 5000, in particular between 200 and 2000, in particular between 500 and 1000. The bigger the ratio is, the steeper is the change of intensity slope.

In an embodiment, the generated supercontinuum has a temporal profile similar to a temporal profile of the ghost pulse imprinted on the carrier pulse. The term "similar" in this respect means that the temporal profiles to be compared have—after an optional proportional scaling of one temporal profile to match the other temporal profile—an appearance (being defined, e.g., by a duration and/or a slope of an increase or decrease in intensity and/or a length of decreased intensity) being at least 50%, in particular at least 70%, in particular at least 80%, in particular at least 90%, in particular at least 95%, in particular at least 99% identical.

In an embodiment, the generated supercontinuum has a temporal profile similar to a light pulse used for creating the intensity hole in the carrier pulse. The term "similar" is to be construed as explained above.

In an embodiment, the generated supercontinuum will be shorter compared to a supercontinuum generated without a ghost pulse. In this embodiment, the supercontinuum has a negative chirp. Since transparent optics (e.g. non-linear material, lenses, etc.) introduce a positive chirp in the UV to NIR spectral region, the negatively chirped supercontinuum will be compressed by passing these optics, meaning the effective pulse length of the supercontinuum will become shorter without complex optical setups. Thus, an overall shorter supercontinuum pulse length results.

Typically, the frequencies of the supercontinuum cover a broad spectral range. The spectral width is often difficult to determine, since the spectral form is not Gaussian. Within the framework of the present application, the spectral width of the supercontinuum is defined as the range from the lowest to highest frequency at half maximum intensity, i.e., from the lowest frequency at which the intensity of the spectrum increases to half height of its first maximum to the highest frequency at which the intensity of the spectrum decreases to half height of its last maximum. The shorter second laser pulse (e.g., a femtosecond pulse) generating the supercontinuum overlaps with the supercontinuum and is thus difficult to separate from the supercontinuum. In an embodiment, only the lowest 5% of the spectral intensity at each wavelength are considered as supercontinuum. Typical supercontinuum spectra have spectral widths of 200 cm$^{-1}$ to 20000 cm$^{-1}$, in particular 300 cm$^{-1}$ to 19000 cm$^{-1}$, in particular 400 cm$^{-1}$ to 18000 cm$^{-1}$, in particular 500 cm$^{-1}$ to 17000 cm$^{-1}$, in particular 600 cm$^{-1}$ to 16000 cm$^{-1}$, in particular 700 cm$^{-1}$ to 15000 cm$^{-1}$, in particular 800 cm$^{-1}$ to 14000 cm$^{-1}$, in particular 900 cm$^{-1}$ to 13000 cm$^{-1}$, in particular 1000 cm$^{-1}$ to 12000 cm$^{-1}$, in particular 2000 cm$^{-1}$ to 11000 cm$^{-1}$, in particular 3000 cm$^{-1}$ to 10000 cm$^{-1}$, in particular 4000 cm$^{-1}$ to 9000 cm$^{-1}$, in particular 5000 cm$^{-1}$ to 8000 cm$^{-1}$, in particular 6000 cm$^{-1}$ to 7000 cm$^{-1}$.

In an embodiment, the carrier pulse has a wavelength lying in a range between 100 nm and 20,000 nm, in particular between 200 nm and 20,000 nm, in particular between 200 nm and 15,000 nm, in particular between 300 nm and 14,000 nm, in particular between 400 nm and 13,000 nm, in particular between 500 nm and 12,000 nm, in particular between 600 nm and 11,000 nm, in particular between 700 nm and 10,000 nm, in particular between 800 nm and 9000 nm, in particular between 900 nm and 8000 nm, in particular between 1000 nm and 7000 nm, in particular between 2000 nm and 6000 nm, in particular between 3000 nm and 5000 nm.

In an embodiment, a central spectral range of the supercontinuum is defined by the second central moment of the spectral distribution of the supercontinuum. This central spectral range can also be denoted as spectral width of the supercontinuum. In an embodiment, the spectral width of the supercontinuum is exactly or at least 2 times, in particular exactly or at least 3 times, in particular exactly or at least 5 times, in particular exactly or at least 10 times, in particular exactly or at least 20 times, in particular exactly or at least 30 times, in particular exactly or at least 50 times, in particular exactly or at least 100 times, in particular exactly or at least 200 times, in particular exactly or at least 300 times, in particular exactly or at least 500 times, in particular exactly or at least 1000 times, in particular exactly or at least 2000 times, in particular exactly or at least 5000 times, in particular exactly or at least 10,000 times, in particular exactly or at least 20,000 times, in particular exactly or at least 30,000 times, in particular exactly or at least 50,000 times, in particular exactly or at least 100,000 times bigger than the spectral width of the carrier pulse used to generate the supercontinuum. In an embodiment, the spectral width of the supercontinuum is bigger than the spectral width of the carrier pulse used to generate the supercontinuum to an extent lying in a range between 2 times and 100,000 times or any other interval that can be built up from the precedingly mentioned values (e.g., 3 times to 50,000 times, or 200 times to 2000 times, etc.).

In an embodiment, the step of introducing a ghost pulse or a coherent intensity hole into the carrier pulse is carried out by modulating the optical properties of the non-linear material. Due to this modulation of the optical properties, the carrier pulse is modulated coherently over time to induce a sudden decrease followed by an increase in intensity.

Typically, the carrier pulse is close to be transform limited. Thus, the carrier pulse cannot be manipulated by reorganization of amplitude, polarization or phase to acquire a short intensity change, such as a ghost pulse. This is only possible for pulses with a broader spectral bandwidth. Pulses with broad spectral bandwidth and a coherent relation between their frequencies can be compressed to short pulses and are able to exhibit fast temporal changes. This relation is described by the Fourier Transform. Transform limited pulses obtain the shortest possible pulse length with respect to their spectral properties (bandwidth).

The interaction of the second shorter laser pulse having a broader bandwidth with the carrier laser pulse having a smaller bandwidth in a non-linear material transfers bandwidth from the shorter laser pulse to the carrier laser pulse. Thus, the imprinting of the short ghost pulse onto the carrier laser pulse is possible. As a result, the spectral bandwidth of the carrier pulse is increased by this non-linear interaction.

In an embodiment, the carrier pulses are 100% transform limited, in particular 90% transform limited, in particular 80% transform limited, in particular 50% transform limited, in particular 20% transform limited, in particular more than 10% transform limited, in particular transform limited to a degree lying in a range of from 10% to 100%, in particular of from 20% to 90%, in particular of from 30% to 80%, in particular of from 40% to 70%, in particular of from 50% to 60%.

In an embodiment, the carrier laser pulse is not transform limited but chirped to different degrees. In an embodiment, the modulation of the optical properties of the chirped carrier laser pulse imprinting the ghost pulse is carried out by an ultrasound wave interacting with a material, or by a pulse shaper, or by a second shorter laser pulse interacting with the chirped carrier laser pulse in a non-linear material.

In an embodiment, the modulation of the optical properties of the non-linear material imprinting the ghost pulse is carried out by an ultrasound wave and a coherent interaction in the non-linear material.

In an embodiment, the modulation of the optical properties of the chirped carrier pulse imprinting the ghost pulse is carried out by a pulse shaper, a birefringent material, or a non-linear material.

In an embodiment, the modulation of the optical properties of the non-linear material imprinting the ghost pulse is carried out by an electromagnetic wave and a coherent interaction in the non-linear material.

In an embodiment, the step of introducing a ghost pulse or an intensity hole into the carrier pulse is carried out by radiating the carrier pulse and a shorter light pulse having a temporal width corresponding to the second temporal width onto the same non-linear material. This results in a coherent interaction between the carrier pulse and the shorter light pulse within the non-linear material. The ghost pulse or an intensity hole in the carrier pulse is the result of this coherent interaction.

Typical coherent non-linear effect generating a ghost pulse are for example second-harmonic generation, difference-frequency generation, optical parametic amplification, optical Kerr effect, etc. These non-linear effects can be used to imprint the temporal properties of the shorter light pulse onto the carrier pulse, generating a ghost pulse. By using the example of second harmonic generation, intensity of the carrier pulse and the short pulse is used to create an additional pulse called second harmonic pulse with a frequency at the sum-frequency of the center frequencies of the carrier pulse and the short pulse. As a result a temporal intensity increase of the carrier pulse and the short pulse occurs. Choosing the temporal properties of the carrier pulse and the short pulse as described above, the ghost pulse or an intensity hole in the carrier pulse is the result of this coherent interaction. The higher the efficiency of the non-linear effect under fulfilling coherent properties (i.e. phase matching), the stronger is the ghost pulse or the intensity hole in the carrier pulse.

In general, every coherent non-linear interaction between the longer carrier pulse and the shorter laser pulse could be used to generate ghost pulses. In another embodiment, Kerr gating is chosen as non-linear interaction. For this purpose, a polarization of the carrier pulse is rotated during the interaction with the shorter light pulse. Thereby, the interaction with the shorter pulse results in a sudden polarization change of the carrier pulse. With the help of a polarizer the polarization change is transferred to an intensity of the carrier pulse, leading to an intensity hole in the carrier pulse.

Several non-linear materials can be used to generate supercontinuum spectra. In an embodiment, the first and second non-linear materials are independently chosen from any of sapphire, yttrium aluminum garnet (YAG), water, $CaF_2$, $BaF_2$, $YVO_4$, LiF, $Al_2O_3$, $SiO_2$, monopotassium phosphate (KDP), beta barium borate (BBO), potassium titanyl phosphate (KTP), a crownglass of the type BK7 (a borosilicate glass), potassium titanyl arsenate (KTA), KGW (Kalium-Gadolinium-Wolframat), ZnS, $AgGaS_2$, MgO, ZnSe. The supercontinuum spectrum or white light generation is typically achieved by focusing the short pulse into the non-linear material or directing it through the material. The generation can also be performed in fibers of this material or other materials. Very often also gases are used to generate supercontinuum spectra (Ar, $N_2$, He, Ne, etc.). In principle, any solid, liquid, or gaseous material exhibiting a spectral range with strong non-linear properties can be used for supercontinuum generation (examples see Alfano).

Non-linear media are materials that interact with the electric field in the second or higher order (non-linear interaction). Thereby, typically a polarization is induced into light that is emitted by the material. The induced polarization is not linear in the interacting electric field anymore. The polarization deviates from linear behavior as a function of the electric field. Thus, non-linear polarization occurs. A simple example is that the index of refraction changes with the intensity of the interacting field.

The coherent non-linear process used to generate a sharp intensity decrease in the carrier pulse or ghost pulse in the carrier pulse is a process involving the electric field of another pulse, the non-linear polarization of second or higher order, and/or the susceptibility of second or higher order.

In an embodiment, the supercontinuum has a negative chirp.

In an embodiment, the supercontinuum has a negative chirp in a central spectral range of the supercontinuum around a frequency of the carrier pulse. The spectral position of the supercontinuum is typically around the carrier frequency Wi of the light pulse (carrier pulse) responsible for SPM. That is the light pulse with the strong change in intensity over time introducing the fast change of δn according to equation 3.

Since most ultrafast laser systems are working around 800 nm or 1030 nm, the supercontinuum is typically around these wavelengths. This is according to current knowledge unavoidable, since only short light pulses can efficiently generate supercontinuum spectra.

With the introduction of ghost pulses into a carrier pulse, one can transfer the wavelengths of the supercontinuum. In an exemplary and illustrative embodiment, a carrier pulse at a chosen wavelength between 200 nm and 15000 nm with a FWHM of 1-2 ps is taken and a shorter femtosecond pulse (e.g. 200 fs at 800 nm, 400 nm, 515 nm or 1030 nm) is used to generate the negative intensity change or ghost pulse in the carrier pulse. Hence, a ghost pulse at the chosen wavelength between 200 nm and 15000 nm is obtained. Due to this ghost pulse, a negatively chirped supercontinuum is generated around the chosen wavelength. Thus, the supercontinuum wavelength is transferred to the spectral position of the carrier pulse, i.e. to an arbitrary wavelength between, e.g., 200 nm and 15000 nm and is no longer limited to the available wavelengths of ultrafast laser systems such as 800 nm or 1030 nm.

In an embodiment, more than one ghost pulses or short-term intensity holes are introduced into carrier pulses with different carrier frequency $\omega_1$. Then, different supercontinuum spectral profiles can be generated.

In an embodiment, several ghost pulses introduced into the carrier pulse differ in at least one of a spectral position of the carrier pulse (e.g. for a chirped carrier pulse), an intensity profile of the ghost pulse, and the second temporal width of the ghost pulse from each other. By such a modulation of the properties of the individual ghost pulses, it is particularly easy to generate different supercontinuum spectral profiles.

In an embodiment, the presently explained and claimed process of supercontinuum spectrum generation can be distinguished from the supercontinuum generation process known from prior art being based on using a short pulse by the amount of self-focusing. In this embodiment, the self-focusing is smaller than 50%, in particular smaller than 40%, in particular smaller than 30%, in particular smaller than 20%, in particular smaller than 10%, in particular smaller than 5%, in particular smaller than 2%, in particular smaller than 1% in supercontinuum generation with ghost pulses than in a supercontinuum generation process known from prior art being based on using a short pulse. In an embodiment, the self-focusing lies in a range of 1% to 50%, or any other interval that can be built up from the preceding the mentioned values, like, e.g., 2% to 40% or 10% to 30% etc.

In an embodiment, the presently explained and claimed process of supercontinuum spectrum generation can be distinguished from the supercontinuum generation process known from prior art being based on using a short pulse by a smaller multi-photon absorption effect. In an embodiment, the effect of multi-photon absorption processes is smaller than 50%, in particular smaller than 40%, in particular smaller than 30%, in particular smaller than 20%, in particular smaller than 10%, in particular smaller than 5%, in particular smaller than 2% or in particular smaller than 1% in supercontinuum generation with ghost pulses than in a supercontinuum generation process known from prior art being based on using a short pulse. In an embodiment, the effect of multiphoton absorption processes lies in a range that is built up from the precedingly mentioned values, e.g., a range of 1% to 50%, or 5% to 30%, etc.

In an embodiment, the presently explained and claimed process of supercontinuum spectrum generation can be distinguished from the supercontinuum generation process known from prior art being based on using a short pulse by a smaller effect of plasma interaction absorption. In an embodiment, the effect of plasma interaction is smaller than 50%, in particular smaller than 40%, in particular smaller than 30%, in particular smaller than 20%, in particular smaller than 10%, in particular smaller than 5%, in particular smaller than 2% or in particular smaller than 1% in supercontinuum generation with ghost pulses than in a supercontinuum generation process known from prior art being based on using a short pulse. In an embodiment, the effect of plasma interaction lies in a range that is built up from the precedingly mentioned values, e.g., a range of 1% to 50%, or 5% to 30%, etc.

In an embodiment, the supercontinuum is generated with more than 50% contribution of self-phase modulation, in particular more than 60%, in particular more than 70%, in particular more than 80%, in particular more than 90%, in particular more than 95%. In an embodiment, the contribution of self-phase modulation lies in the range being built up from the preceding mentioned values, e.g., in a range between 50% and 95%, or in a range between 60% and 80%, etc.

In an aspect, the proposed solution relates to a laser arrangement for generating a supercontinuum, wherein the laser arrangement comprises means adapted to execute the steps of the previously explained method (i.e., a method according to any of claims 1 to 13).

In an aspect, the proposed solution relates to a laser arrangement for generating a supercontinuum, wherein the laser arrangement comprises means adapted to execute the steps of the previously explained method (i.e., a method according to any of claims 1 to 13).

In an aspect, the proposed solution relates to a computer program (or a computer program product) comprising instructions to cause the laser arrangement according to the preceding paragraph to execute the steps of the previously explained method (i.e., a method according to any of claims 1 to 13).

In an aspect, the proposed solution relates to a computer-readable medium having stored thereon the computer program according to the preceding paragraph.

An aspect of the proposed solution relates to an (laser) arrangement for generating a supercontinuum. Thereby, the arrangement comprises a first laser source for emitting a first laser pulse. This first laser pulse is used as carrier laser pulse. The arrangement further comprises a non-linear material arranged with respect to the first laser source such that a first laser pulse emitted by the first laser source is radiated onto the non-linear material.

Additionally, the arrangement comprises a processor and a memory device. The memory device comprises a computer-readable program that, when executed on the processor, causes the processor to carry out a method according to the preceding explanations.

Thereby, the method comprises the steps explained in the following.

In one method step, a carrier laser pulse having a first temporal width $\Delta\tau_1$ is radiated onto the first non-linear material.

At the same time, a second shorter laser pulse having a second temporal width $\Delta\tau_2$ is radiated onto the first non-linear material, thereby changing the non-linear properties of the first non-linear material. This coherent interaction or interference of both laser pulses introduces a ghost pulse or a coherent short-term intensity hole into the first laser pulse. Thereby, the term "short-term" indicates that the length of the ghost pulse is short with respect to the length of the first laser pulse. Thus, a ghost pulse having a third temporal width $\Delta\tau_3$ is imprinted into the carrier pulse. In this context, the second temporal width $\Delta\tau_2$ is at least two times shorter than the first temporal width $\Delta\tau_1$.

Afterwards, the carrier laser pulse with imprinted ghost pulse is radiated onto the first non-linear material or a second non-linear material forming part of the laser arrangement and thus generating a supercontinuum around the center frequency of the carrier pulse. The supercontinuum is generated by self-phase modulating due to the interaction of the ghost pulse with the first or second non-linear material.

In an embodiment, the arrangement comprises the first laser source and a second laser source as well as a delay line. The second laser source serves for emitting the second shorter laser pulse.

The delay line is a mechanically movable set of mirrors. Such movement can be achieved under control of the processor. The delay-line serves for adjusting the carrier laser pulse and the second shorter laser pulse onto the non-linear material so that they interact with the non-linear material at the same time.

In an embodiment, the ghost pulse has a third temporal width being at least two times shorter than the first temporal width. The ghost pulse exhibits an intensity decrease and a subsequent intensity increase. In an embodiment, an absolute value of a pulse energy of the intensity hole is bigger than 10 nJ.

In an embodiment, a ghost pulse can be imprinted on a carrier pulse at a given polarization of the light pulse and at a different polarization of the light pulse, the inverted ghost pulse can be created. This can be well performed by a Kerr effect. The resulting carrier pulse with a ghost pulse at one polarization and an inverted ghost pulse at another polarization can be used in a non-linear crystal, such as a BBO, KDP, KTP, KTA, LiNbO3, GaSe, AgGaS2 crystal, to generate a supercontinuum in a first part of the crystal and use the carrier pulse or the inverted ghost pulse to generate new frequencies by an optical parametric amplification (OPA) process or other non-linear processes, such as SFG, DFG, or OPA. Depending on the interacting pulses type I and type II non-linear processes can be used. With a proper non-linear crystal orientation, that is phase matching of the type I or type II (or other) processes, this single pulse, a carrier pulse with ghost pulse and/or inverted ghost pulse at various polarizations, can generate the seed pulse from the supercontinuum and the amplification pulse for a complete non-linear process, such as OPA or NOPA, to amplify laser pulses from the generated supercontinuum spectrum in one crystal. This application allows for supercontinuum (seed) generation and seed amplification by the pump pulse $\omega_2$ in the same non-linear crystal.

This application is especially useful for lasers with strong but not ultrafast laser pulses. These laser pulses exhibit pulse powers above 0.5 mJ, in particular above 1 mJ, in particular above 2.5 mJ, in particular above 5 mJ, in particular above 7.5 mJ, in particular above 10 mJ, in particular above 12.5 mJ, in particular above 15 mJ, in particular above 20 mJ, in particular lying in a range that can be built up from these values. At the same time, these laser pulses exhibit a narrow spectral bandwidth of less than 4 nm, in particular less than 3.5 nm, in particular less than 3 nm, in particular less than 2.5 nm, in particular less than 2 nm, in particular less than 1.5 nm, in particular less than 1 nm, in particular lying in a range that can be built up from these values. Furthermore, these pulses have a pulse duration of longer than 2 ps, in particular longer than 10 ps, in particular longer than 20 ps, in particular longer than 50 ps, in particular longer than 100 ps, in particular longer than 150 ps, in particular longer than 200 ps, in particular lying in a range that can be built up from these values. These powerful laser pulses can be well used to amplify pulses, but other frequencies cannot be generated, because the intensity change within these pulses is not strong enough to generate a supercontinuum. With an imprinted ultrafast ghost pulse, a supercontinuum can be generated easily, and selected wavelength ranges can be amplified by the strong carrier pulse.

In an embodiment, the carrier pulse can have different polarizations. One or several ghost pulses imprinted at different time points on this carrier pulse, can be located at carrier pulse positions with different polarizations. Thus, different supercontinuum fields can be generated at different time points with different polarizations. These properties could be used to foster interactions of different polarizations and spectral positions in non-linear material or to amplify more complex pulse structures.

In an embodiment, several ghost pulses can be imprinted on a carrier pulse with the same or different polarizations. These ghost pulses can differ in amplitude profiles, in temporal width ($\Delta\tau_3$), and in intensity depth. Since the ghost pulses introduce new spectral features on the carrier pulse at the temporal positions of the ghost pulse, the imprinted ghost pulses can be used to transport information on a carrier pulse. Since this information is coherent, coherent processes can be used to write and read the information to and from the carrier pulse.

In an embodiment, several ghost pulses could be imprinted on a carrier pulse with the same or different polarizations. These ghost pulses can differ in amplitude profiles, in temporal width ($\Delta\tau_3$), and in intensity depth. The carrier pulse with the imprinted ghost pulse structure can also be used to generate supercontinuum spectra in a non-linear crystal. These supercontinuum spectra of the different ghost pulses represent coherent light sources that interfere constructively and destructively. These interactions and interference effects can be used to transfer, modulate, code and decode information.

All aspects and embodiments explained with respect to the method can be combined in any desired way and can be transferred either individually or in any arbitrary combination to the described (laser) arrangement, to the described computer program, to the described computer program product, and to the described computer-readable medium. Likewise, all aspects and embodiments explained with respect to the (laser) arrangement can be combined in any desired way and can be transferred either individually or in any arbitrary combination to the described method, to the described computer program, to the described computer program product, and to the described computer-readable medium.

BRIEF DESCRIPTION OF THE DRAWINGS

Further details of aspects of the solution will be explained with respect to exemplary embodiments and accompanying Figures.

DETAILED DESCRIPTION

Figure 1A:
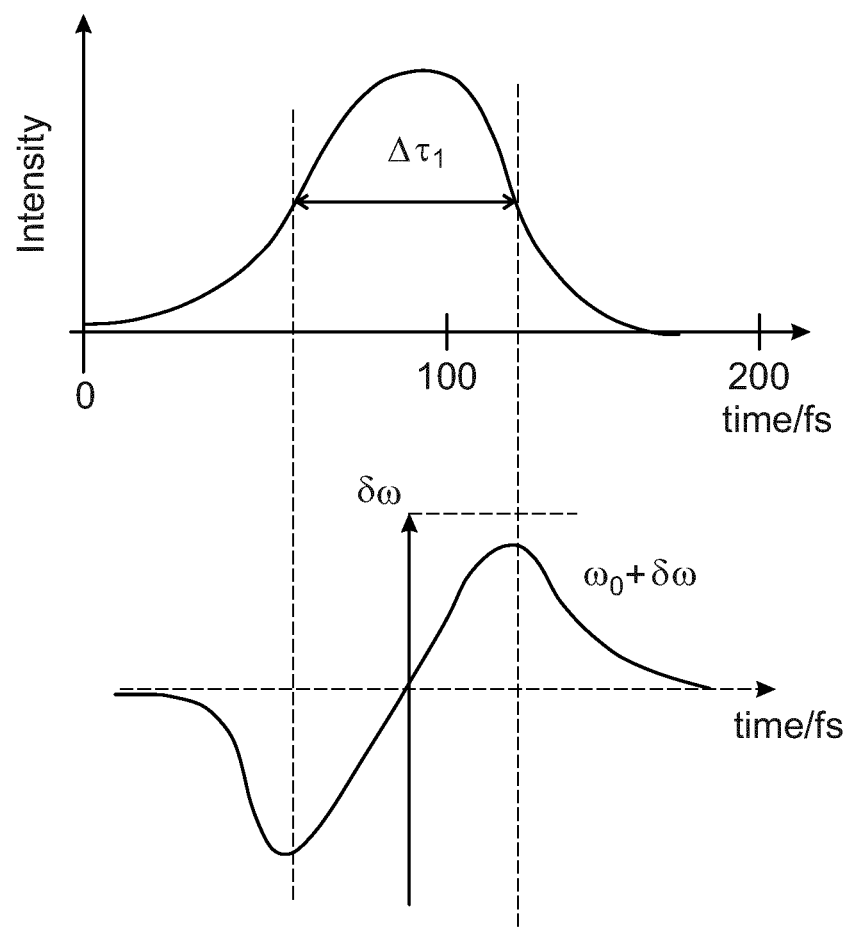
FIG. 1A shows a schematic depiction of a SPM process according to prior art.

FIG. 1A shows a self-phase modulating (SPM) process known from prior art and already explained in the introductory part of the present description. Briefly, an ultrashort femtosecond pulse with a FWHM of $\Delta\tau_1$ passing a non-linear medium generates new frequencies that are lower in frequencies at the leading edge of the pulse (at around 50 fs) and higher in frequencies at the tailing (following) edge of the pulse (at around 120 fs). The new generated frequencies are positively chirped, since the lower frequencies were generated earlier than the higher frequencies.

Figure 1B:
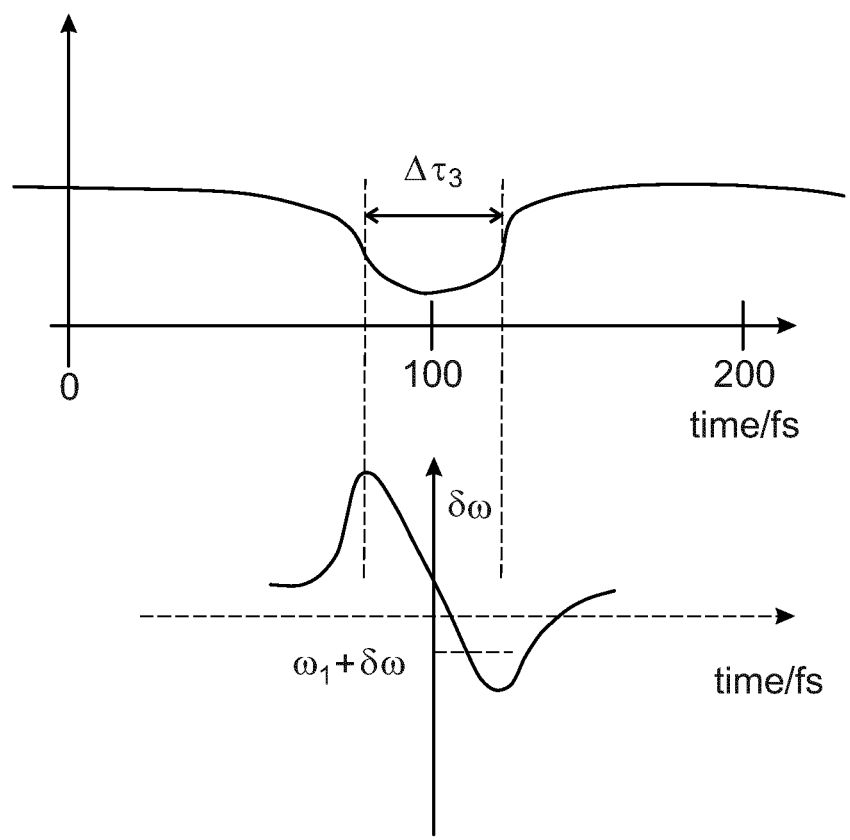
FIG. 1B shows a schematic depiction of a SPM process making use of a ghost pulse.

FIG. 1B shows a carrier pulse with longer temporal length that exhibits a sudden intensity change in a shape of a negative light pulse with $\Delta\tau_3$. The intensity change generates new frequencies around $\omega_1$ in a non-linear material. The higher frequencies are generated first by the falling intensity edge, followed by the lower frequencies generated by the rising intensity edge. A negative chirp results.

The time scale $\tau$ of a light pulse is defined here as the second central moment of a distribution of temporal and spectral properties to define the temporal and spectral width of the light pulse. $\tau_r$ denotes the time scale (or temporal width) of the carrier pulse. $\tau_g$ denotes the time scale (or temporal width) of the ghost pulse. The ratio R between $\tau_r/\tau_g$ is, in the embodiment of FIG. 1B, about 30. This results from a first temporal width $\tau_r$ of the carrier pulse of about picoseconds (assuming Gaussian pulse shapes), while $\tau_g$ is about 40 fs.

The interaction of the ghost pulse with a non-linear material generates a supercontinuum by SPM. As depicted in FIG. 1B, the generation process of the new frequencies is similar to the generation process with real pulses, shown in FIG. 1A. A clear distinction between the two processes is that due to the opposite course of intensity change (or of the first derivative of intensity), the newly generated frequencies are different: With a real pulse, the lower frequencies are generated before the higher frequencies, resulting in a positive chirp. With the ghost pulse, the higher frequencies are generated before the lower frequencies, resulting in a negative chirp. Thus, the supercontinuum generated by ghost pulses is generated with a negative chirp.

Figure 2A:
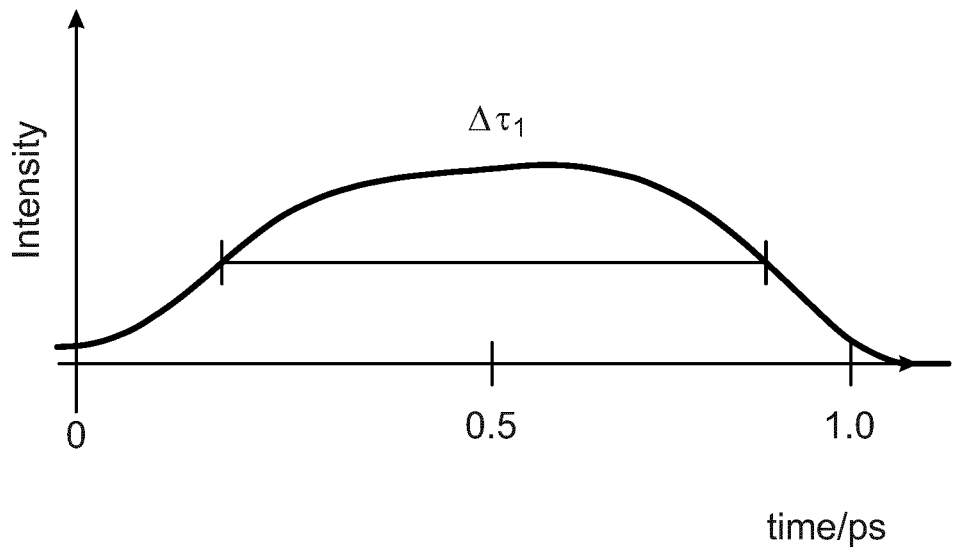
FIG. 2A shows an intensity profile of a carrier pulse.
Figure 2B:
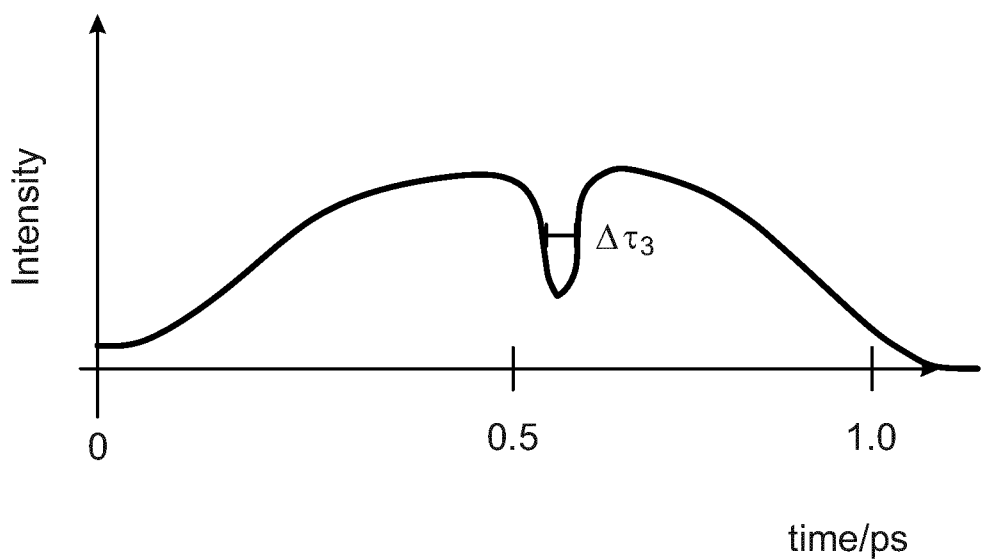
FIG. 2B shows an intensity profile of a carrier pulse with an imprinted ghost pulse.

FIG. 2A shows an intensity profile of the carrier pulse or longer light pulse with a FWHM of $\Delta\tau_1$. FIG. 2B shows a resulting intensity of the carrier pulse of FIG. 2A, with an imprinted or interfering ghost pulse. The ghost pulse has a FWHM of $\Delta\tau_3$.

Figure 3:
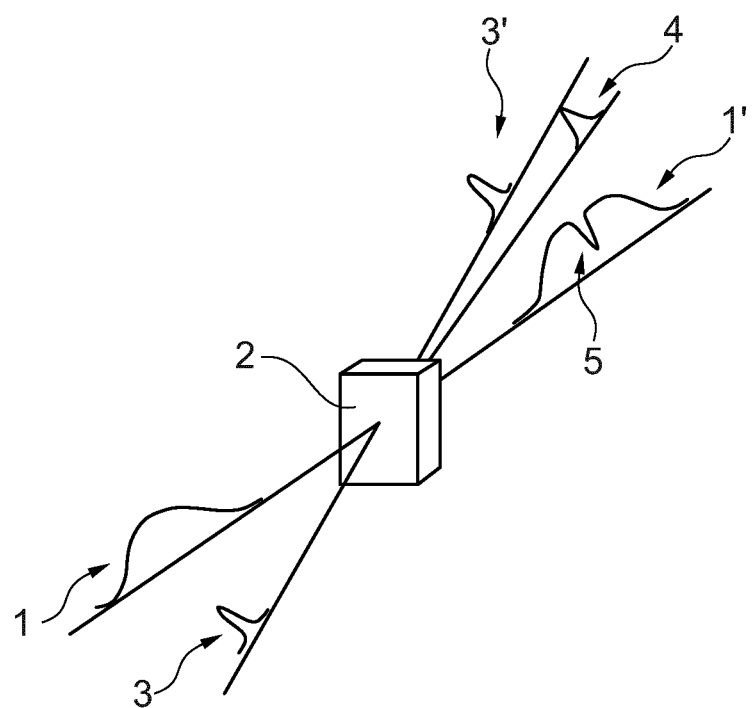
FIG. 3 shows a scheme of an experimental setup for generating ghost pulses via sum-frequency generation.

A further principle of ghost pulse generation is explained in FIG. 3. A carrier pulse 1 having a longer temporal length (or width) $\tau_r$ and having a wavelength of 1030 nm interacts in a non-linear medium 2 with a shorter light pulse 3 having a temporal length (or width) of $\tau_g$ and having a wavelength of 515 nm. The interaction is non-linear and can be of second, third or higher order including $\chi^{(2)}$, $\chi^{(3)}$ or higher order susceptibilities. For example, a sum-frequency generation (a $\chi^{(2)}$ process) in BBO (beta-barium borate) as non-linear medium 2 generates a sum-frequency of the carrier pulse and the shorter light pulse, resulting in a sum-frequency pulse 4 having a wavelength of 343 nm. This process reduces the intensity of the carrier pulse 1 and the shorter light pulse 3. If the carrier pulse 1 is significant longer than the shorter light pulse 3, the intensity decrease of the carrier pulse 1 generates a ghost pulse 5, resulting in a carrier pulse 1' with ghost pulse 5. In addition, the intensity of the shorter pulse 3 is decreased so that an intensity-decreased shorter light pulse 3' results. The wavelength of the carrier pulse 1' with ghost pulse 5 is still 1030 nm. Likewise, the wavelength of the intensity-decreased shorter light pulse 3' remains unchanged at 515 nm.

As briefly explained above, the wavelength of the carrier pulse determines the wavelength (or frequency) of the generated supercontinuum. This will be explained in a further example. In this example, a 1 ps pulse at 1030 nm is used as a carrier pulse and a 170 fs pulse at 515 nm is used to generate a ghost pulse via sum-frequency generation. The ghost pulse has a carrier frequency at 1030 nm is focused into a sapphire window generating a negatively chirped supercontinuum around 1030 nm (ranging from around 530 nm to the near infrared around 1600 nm). Thus, the supercontinuum is generated around the carrier pulse frequency, not around the shorter light pulse used to generate the ghost pulse.

Figure 4:
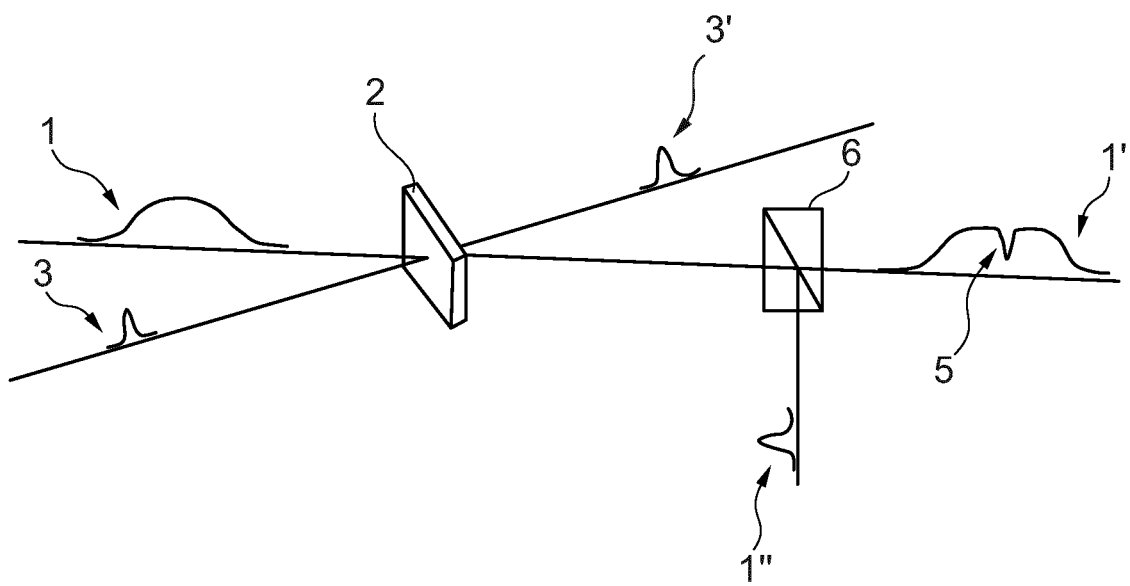
FIG. 4 shows a scheme of an experimental setup for generating ghost pulses by using the Kerr effect.

FIG. 4 shows a scheme for generating ghost pulses by using the Kerr effect. The Kerr effect or Kerr gating is an appropriate $\chi^{(3)}$ process for generating ghost pulses. Here and in all following Figures, the same numeral references as in the preceding Figures are used for the same or similar elements.

The carrier pulse 1 has a horizontal polarization which is rotated partly during an interaction of the carrier pulse 1 with the shorter light pulse 3 in the non-linear medium 2. The shorter light pulse 3 has a polarization that is rotated by 45° with respect to the horizontal plane. Since the shorter light pulse 3 is much shorter than the carrier pulse 1 (and has a rotated polarization), a sudden polarization change of the carrier pulse following the shape of the shorter light pulse 3 is obtained. The carrier pulse 1 exhibits a short change in polarization that can be transferred to an intensity change by using a polarizer (for ultrafast pulses). A carrier pulse 1' comprising a ghost pulse 5 results. In addition, a "negative ghost pulse" 1" (i.e., a real light pulse corresponding in shape and intensity to the shorter light pulse 3 is reflected out of the polarizer 6. Thus, the polarizer 6 serves as scissors for extracting a part of the carrier pulse 1 so as to obtain the carrier pulse 1' with ghost pulse 5. Furthermore, an intensity-decreased shorter light pulse 3' results. The wavelength of this intensity-decreased shorter light pulse 3 remains at 515 nm (corresponding to the wavelength of the shorter light pulse 3). Likewise, the wavelength of the carrier pulse 1 (1030 nm in this embodiment) is not amended by introducing the ghost pulse 5 into the carrier pulse 1'.

A very useful application of ghost pulses is to generate negatively chirped supercontinuum at wavelengths where ultrafast fs pulse generation is much more difficult than ps pulse generation. For example ps pulses at 240 nm or 310 nm can be used as carrier pulses to generate ghost pulses with short pulses at 800 nm. The supercontinuum around 240 nm or 310 nm is negatively chirped and can be easily compressed in simple optical material, e.g. $CaF_2$ windows, to a short fs pulse.

This procedure can also be used for mid-IR ps pulses as carrier pulses and 800 nm or 1030 nm pulses as short pulses to generate a mid-IR supercontinuum. By self-compression in simple optical materials few cycle mid-IR pulses can be generated.

Figure 5:
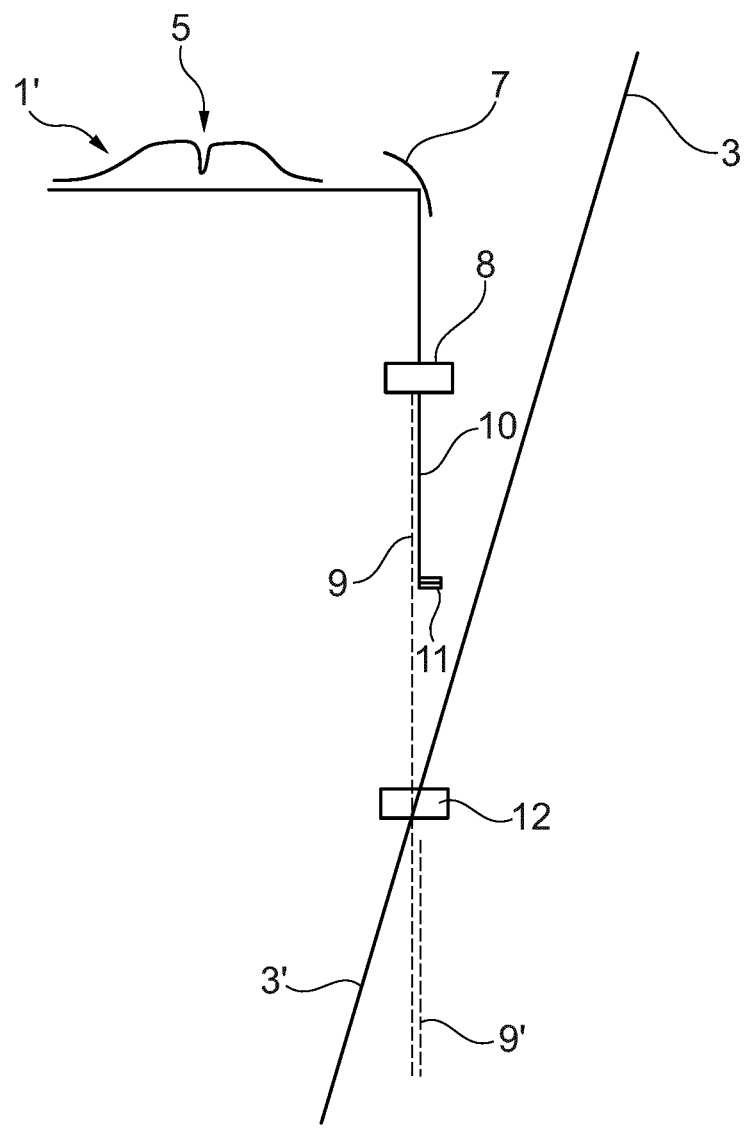
FIG. 5 shows a scheme for an optical parametric amplifier (OPA) or noncollinear OPA (NOPA) using negatively chirped supercontinuum generated by ghost pulses.

Another application is the use of ghost pulses in noncollinear and collinear optical parametric amplifiers (NOPAs and OPAs). This is depicted in FIG. 5. A carrier pulse 1' having a ghost pulse 5 is focused by a parabolic mirror 7 to a sapphire 8 (or, alternatively, to another appropriate non-linear white light material) by which a negatively chirped supercontinuum 9 is generated by SPM. A part 10 of the carrier pulse 1' having a ghost pulse 5 that is not converted into the supercontinuum 9 is directed to a metal plate 11 acting as a beam blocker.

The negatively chirped supercontinuum 9 acts as a seed pulse to seed a NOPA (or OPA) process. The negatively chirped supercontinuum 9 or seed pulse is amplified by a short pump pulse 3 (e.g. a laser pulse having a wavelength of 515 nm and a duration of about 200 fs) that is directed onto the crystal 12. An intensity-decreased pump pulse 3' and an amplified seed pulse 9' result.

The negatively chirped supercontinuum 9 is partly compressed by the non-linear crystal 12 (e.g. BBO) to shorter pulses while interacting with the pump pulse 3. Since BBO introduces a positive chirp to visible light pulses (normal dispersion), the thickness of the crystal 12 has to be adapted so that the positive chirp imprinted by the crystal 12 does not exceed the negative chirp of the supercontinuum 9.

Since the amplified seed pulse 9' is less negatively chirped than the negatively chirped supercontinuum 9 or not chirped at all, the pulse duration of the amplified seed pulse 9' is shorter than that of positively chirped supercontinuum seed pulses known from prior art.

Thus, the experimental setup depicted in FIG. 5 provides shorter output pulses from an OPA or NOPA compared to conventional setups known from prior art making use of a positively chirped supercontinuum.

Moreover, the negatively chirped supercontinuum 9 exhibits a broader amplification range, since for a positively chirped supercontinuum the increasing positive chirp can limit the amplified bandwidth, resulting in longer output pulses that are not compressible with additional optics.

Figure 6:
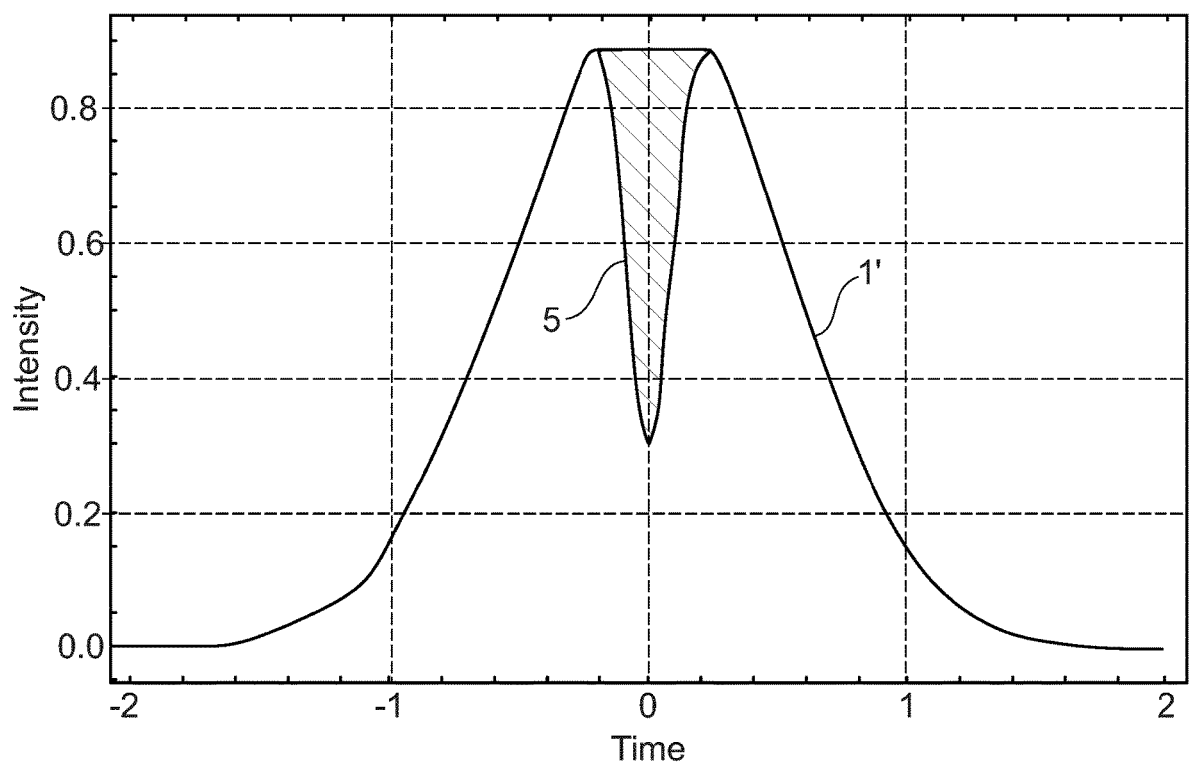
FIG. 6 shows a simulation of the temporal profile of a ghost pulse.

FIG. 6 shows a simulation of the temporal profile of a ghost pulse 5 introduced into a carrier pulse 1'. The negative intensity of the ghost pulse in the temporal profile of the carrier pulse 1' is clearly visible. Thereby, the hatched area represents the missing energy. The absolute value of this missing energy is the absolute value of the pulse energy of the ghost pulse. Without the negative intensity change, there would only be the carrier pulse.

Figure 7:
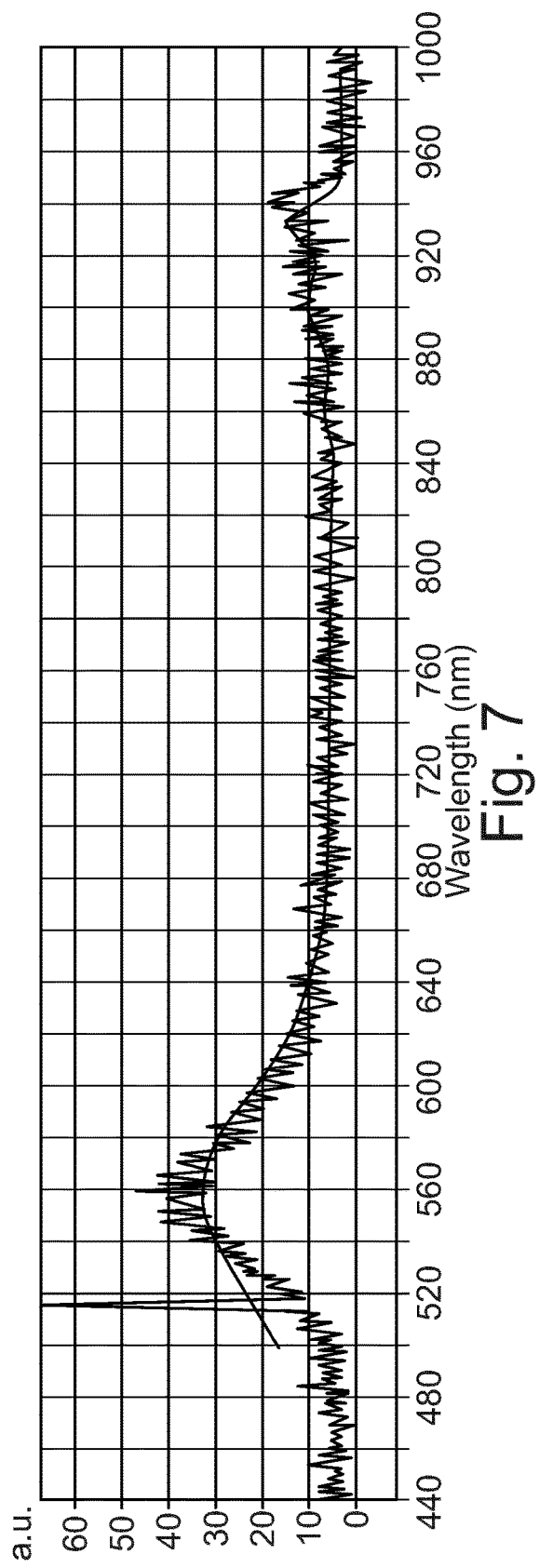
FIG. 7 shows a measured supercontinuum spectrum of a carrier pulse.
Figure 8:
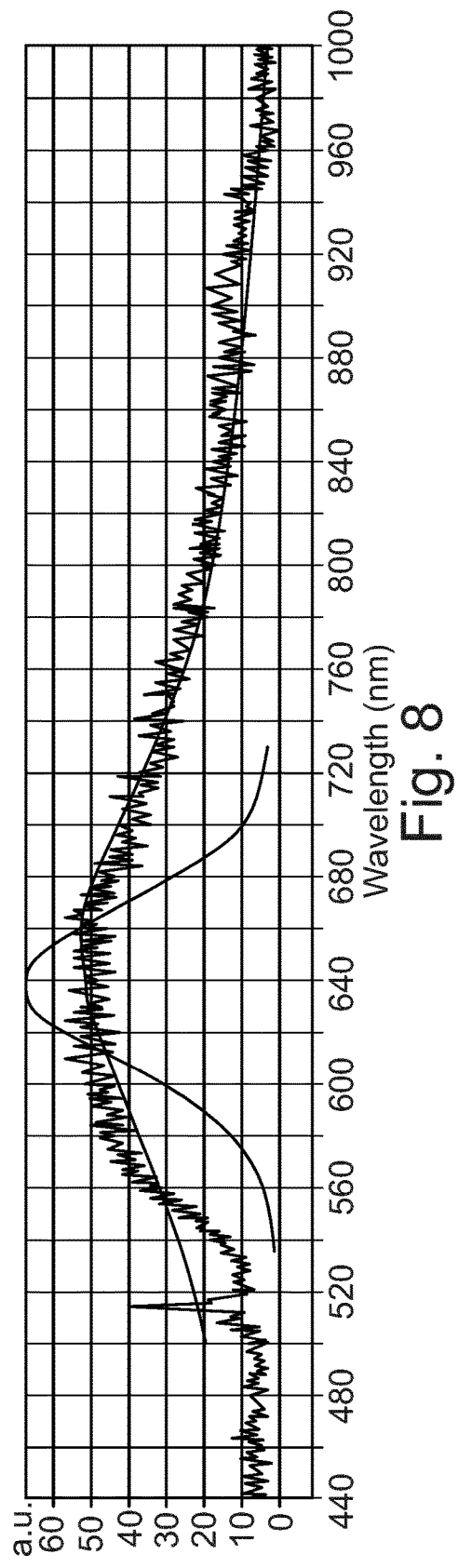
FIG. 8 shows a measured supercontinuum spectrum of a ghost pulse introduced into the same carrier pulse as in FIG. 7.

FIG. 7 shows a supercontinuum spectrum of a carrier pulse (without previously introduced ghost pulse). FIG. 8 shows a supercontinuum spectrum of an identical carrier pulse as in FIG. 7 into which, however, a ghost pulse has been introduced prior to generating the supercontinuum. The differences of the supercontinua that can be only attributed to the introduced ghost pulse are clearly visible.

A normal light pulse of about 200 fs generates a supercontinuum on the high and low energy side of the wavelengths of the light pulse. The temporal shape of the light pulse together with the high energy part of the supercontinuum can be determined by a frequency-resolved optical gating (FROG) process.

In the FROG process, a light pulse called upconversion pulse (e.g., having a wavelength of 1030 nm and a duration of 200 fs) is overlapped temporally and spatially with the supercontinuum in a thin (thickness of 0.1 mm or 0.025 mm) non-linear crystal (e.g. BBO). In this crystal, the sum-frequency of both light pulses is generated and emitted at a different angle. The deviating angle allows for background-free detection of the sum-frequency of both pulses. Since the physical properties of the 200 fs light pulse (upconversion pulse) at 1030 nm are known, the properties of the supercontinuum can be derived.

Figure 9:
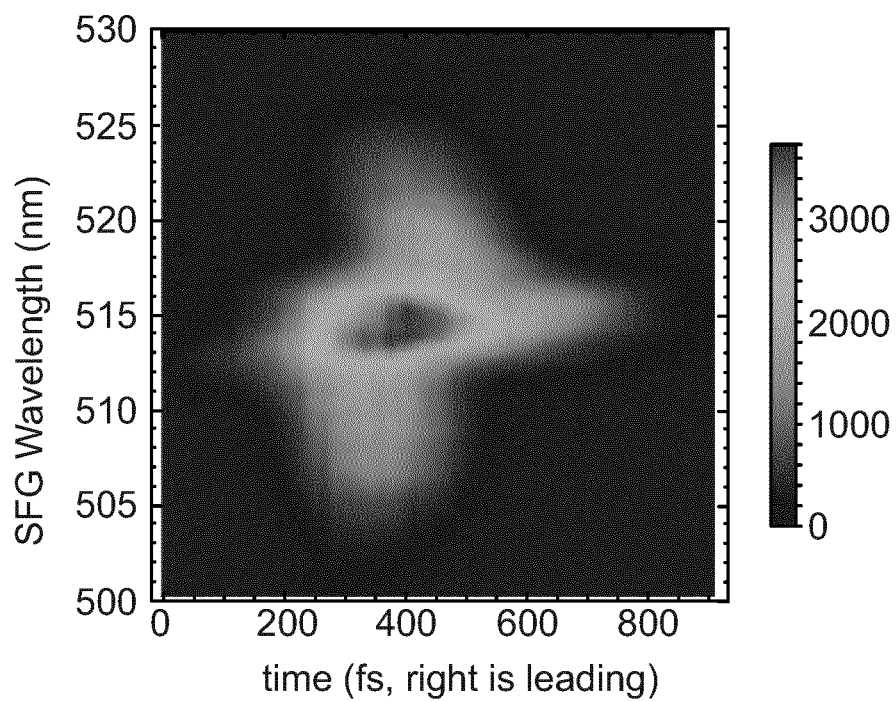
FIG. 9 shows a frequency-resolved optical gating (FROG) of a supercontinuum generated with a normal pulse (range about 1090 nm to 970 nm).

In FIG. 9, the FROG map is generated by a upconversion pulse of 200 fs and 1030 nm, and the supercontinuum generated by a 200 fs light pulse (conventional supercontinuum generation). Here, the leading pulse front is at higher time points. It is clear that the supercontinuum at longer wavelengths around 520 nm of the sum-frequency (corresponding to 1050 nm of the supercontinuum) appears earlier compared to the shorter wavelengths around 507 nm of the sum-frequency (corresponding to ~998 nm of the super continuum). This corresponds to a positively chirped supercontinuum. The supercontinuum is generated by focusing the 200 fs pulse into a sapphire window of 3 mm length. The high intensity part of the supercontinuum has a spectral range from about 1090 nm to about 970 nm. The sum-frequency is depicted between a pulse at 1030 nm (FWHM ~7 nm) and a supercontinuum centered around 1030 nm. The sum-frequency L (in nm) of wavelengths L1 and L2 (>L1) are calculated by L=1/(1/L1+1/L2).

Figure 10:
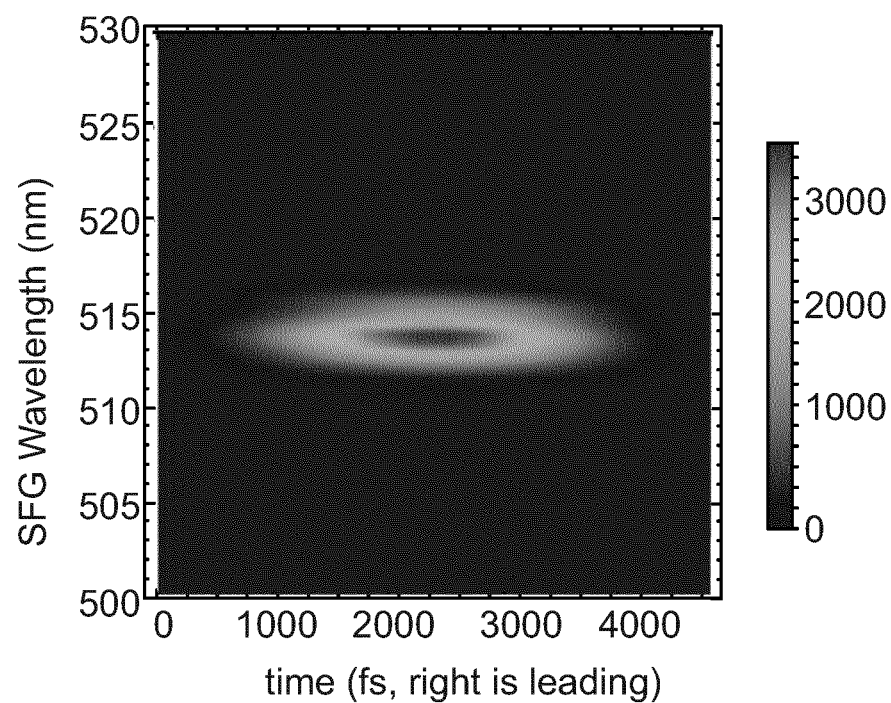
FIG. 10 shows a FROG of a generated carrier pulse.

The carrier pulse was obtained by reducing the spectral width of the carrier pulse to about 1.5 nm (still being centered at 1030 nm). This results in lengthening the pulse duration. The carrier pulse thus obtains a temporal length of about 1.5 ps. Upon sending this carrier pulse through a sapphire window, no supercontinuum is generated. The FROG map of the carrier pulse and an upconversion pulse having a wavelength of 1030 nm is depicted in FIG. 10. It is clearly visible that there is a little intensity change in the center of the carrier pulse.

Figure 11:
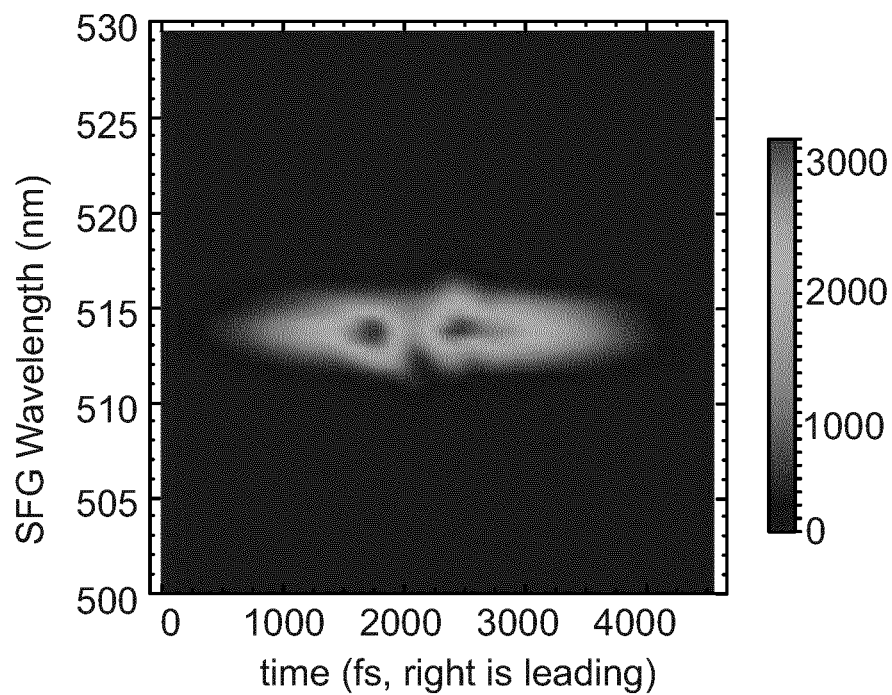
FIG. 11 shows a first FROG of a carrier pulse with imprinted a ghost pulse in the center of the carrier pulse.

Creating a ghost pulse with a temporal length of about 200 fs into the carrier laser pulse creates an intensity decrease in the center of the carrier pulse. The position of the ghost pulse within the carrier pulse can be adjusted by the time-delay between the carrier pulse and the second shorter pulse interacting in the non-linear material. Here, the ghost pulse is positioned at the center of the carrier pulse. This is the position in which the impact on the carrier pulse is generated via sum-frequency generation (e.g. in a BBO crystal). The FROG map generated between the carrier pulse with imprinted ghost pulse and an upconversion pulse of 200 fs and 1030 nm visualizes the intensity increase in the temporal center of the carrier pulse clearly. This is depicted in FIG. 11, where the location of the ghost pulse is clearly visible in the center of the carrier pulse. Both the carrier pulse and the upconversion pulse are centered at 1030 nm. The carrier pulse has a temporal length of about 1.5 ps, and the ghost pulse in the center of the carrier pulse has a temporal length of about 200 fs, wherein the upconversion pulse has a temporal length of also 200 fs.

Figure 12:
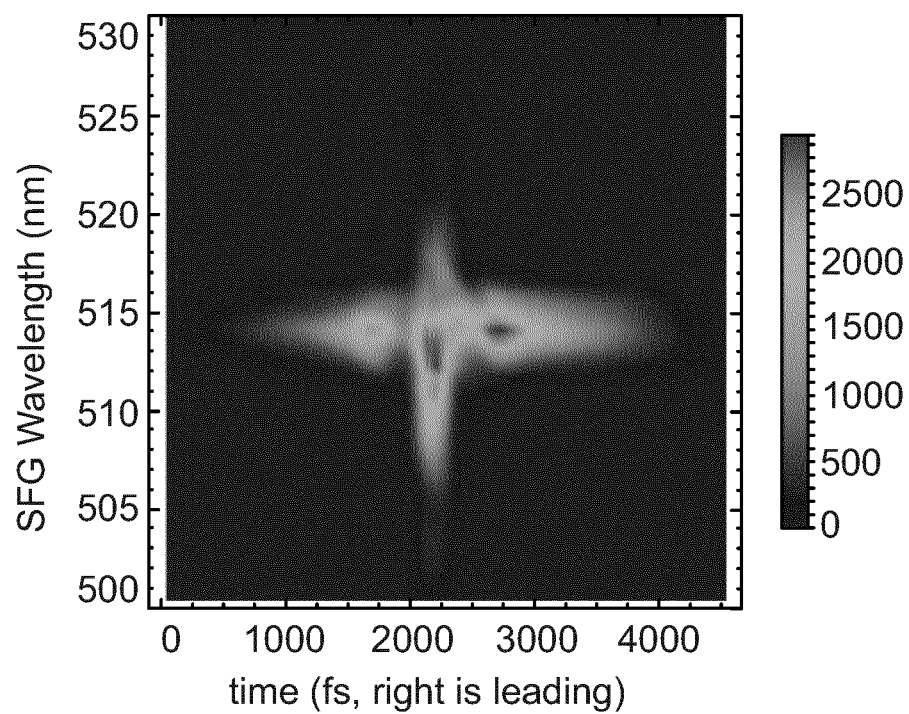
FIG. 12 shows a second FROG of a supercontinuum generation by a carrier pulse with imprinted ghost pulse in the center of the pulse.

Upon focusing the carrier pulse with the ghost pulse in its center into a 3-mm sapphire window, a supercontinuum is generated, i.e., new frequencies (wavelength) at higher and lower energy are generated. The FROG map of the supercontinuum together with the carrier pulse with the upconversion pulse is presented in FIG. 12. In comparison to FIG. 11, new frequencies appear at the center of the carrier pulse. These frequencies are due to supercontinuum generation. They appear on the high (Anti-Stokes) and low (Stokes) energy side of 1030 nm. The time resolution was yet too low to properly detect the time sequence of the Stokes and Anti-Stokes part of the supercontinuum. Therefore, the supercontinuum apparently appears on the high and low energy side of the pulse at about the same time. This indicates a generated supercontinuum with zero chirp, shorter compared to the supercontinuum generated with a short femtosecond pulse shown in FIG. 9.

An identical carrier pulse without ghost pulse cannot be used for supercontinuum generation in the visible range, as explained with respect to FIG. 10.

Figure 13:
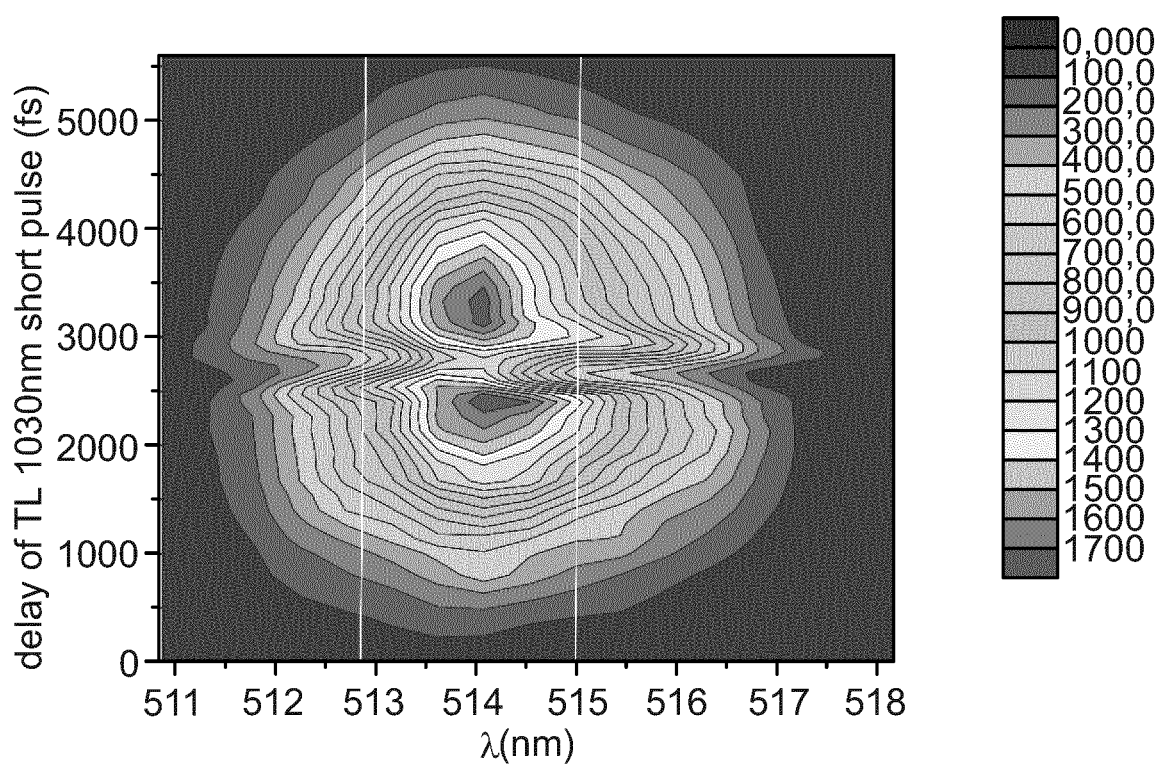
FIG. 13 shows a third FROG of a supercontinuum generated by a first pulse with a ghost pulse in the center of the pulse.

In order to increase the sensitivity of the FROG measurements, the intensity of the supercontinuum was reduced by reducing the absolute intensity of the ghost pulse. The resulting FROG map is depicted in FIG. 13. The leading pulse front is here at low delay times, the ghost pulse in the carrier pulse is located at 2600 fs. The FROG map in FIG. 13 was obtained by a carrier pulse (~2 ps FWHM) with a ghost pulse of ~200 fs focused into a 3-mm sapphire window, resulting in an onset of supercontinuum generation, with an upconversion pulse being transform limited (~200 fs FWHM at 1030 nm).

It is clearly visible from FIG. 13 that the generation of frequencies lower than 1030 nm (Stokes) are observed at the leading pulse front of the ghost pulse, while the frequencies higher than 1030 nm (Anti-Stokes) are observed at the tailing pulse front of the ghost pulse. The onset of the supercontinuum generation is clearly visible at the edges of the ghost pulse. At the beginning of the ghost pulse (~2400 fs) the frequencies are blue shifted (Anti-Stokes side), while at the end of the ghost pulse (~2800 fs) the frequencies are red shifted (Stokes side). This demonstrates the negative chirp of the supercontinuum upon introducing ghost pulses into a carrier pulse.

The supercontinuum generated by a carrier pulse having a ghost pulse was used to seed a NOPA pumped at 515 nm. The results were compared to seeding a NOPA with a conventional supercontinuum.

Figure 14:
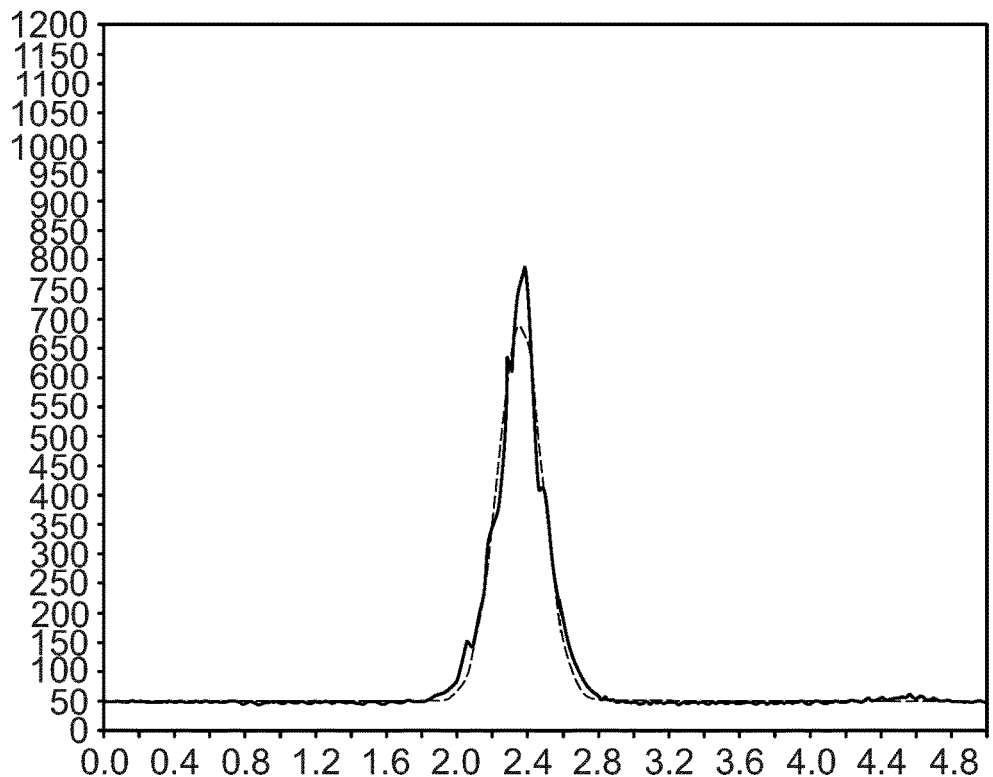
FIG. 14 shows an autocorrelation trace of a NOPA pulse generated with a conventional supercontinuum as a seed and a 515 nm pump pulse.

FIG. 14 shows the autocorrelation trace of a NOPA pulse generated with a conventional supercontinuum as a seed and a 515 nm pump pulse. The autocorrelation trace was measured with an autocorrelator (crystal for 20 fs pulses). The FWHM of the output pulse was measured to be 215 fs.

Figure 15:
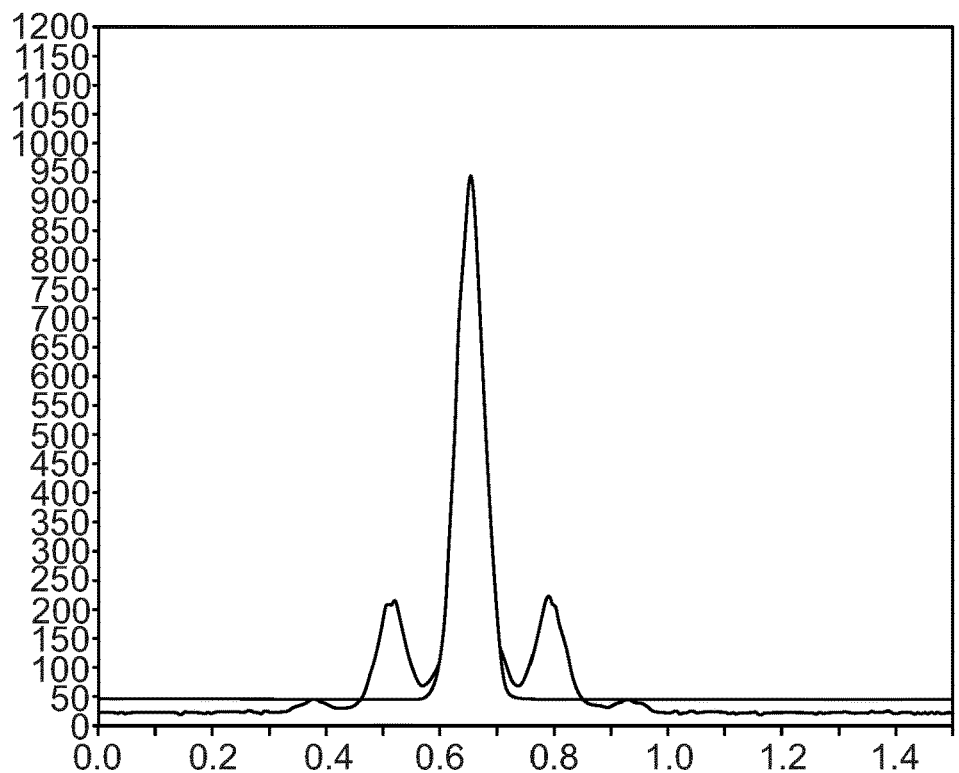
FIG. 15 shows an autocorrelation trace of a NOPA pulse generated with a supercontinuum generated by a ghost pulse as a seed and a 515 nm pump pulse.

In contrast, the FWHM of the output pulse of an autocorrelation trace of a NOPA pulse generated with a supercontinuum generated by a carrier pulse having a ghost pulse as a seed and a 515 nm pump pulse was measured to be only 40 fs with some side lobes. The results are depicted in FIG. 15. The measuring conditions were as similar as possible to the measuring conditions of the experiment the results of which are shown in FIG. 14.

This shows the possibility to use the negatively chirped supercontinuum generated by carrier pulses having a ghost pulse to generate shorter NOPA pulses compared to NOPA pulses using a normal supercontinuum as seed.

According to prior art techniques, the generated supercontinuum pulses have to be compressed with additional optics to become as short as 40 fs. This is no longer necessary by generating a supercontinuum on the basis of a carrier pulse having a ghost pulse.

The invention claimed is:

1. A method for generating a supercontinuum, the method comprising the following steps:
   a) radiating a carrier laser pulse having a first temporal width and a first bandwidth onto a first non-linear material,
   b) at the same time, radiating a second shorter laser pulse having a second temporal width and a second bandwidth onto the first non-linear material, wherein the first bandwidth is smaller than the second bandwidth, thereby changing the non-linear properties of the first non-linear material, transferring bandwidth from the second shorter laser pulse to the carrier laser pulse, and imprinting a ghost pulse having a third temporal width into the carrier pulse; the second temporal width being at least two times shorter than the first temporal width, and
   c) radiating the carrier pulse with imprinted ghost pulse onto the first non-linear material or a second non-linear material and generating, by self-phase modulating, a supercontinuum around the center frequency of the carrier pulse.

2. The method according to claim 1, wherein the first temporal width is defined by a time period of a full width at half maximum of the carrier laser pulse, or by the second central moment of a distribution of temporal properties of the carrier laser pulse; in that the second temporal width is defined by a time period of a full width at half maximum of the second shorter laser pulse, or by the second central moment of a distribution of temporal properties of the second shorter laser pulse; and in that the third temporal width is defined by a time period of a full width at half maximum of the ghost pulse, or by the second central moment of a distribution of temporal properties of the ghost pulse.

3. The method according to claim 1, wherein the second temporal width is 10 ns or less.

4. The method according to claim 1, wherein the supercontinuum has a spectral width lying in a range of between 100 $cm^{-1}$ to 20000 $cm^{-1}$.

5. The method according to claim 1, wherein the carrier laser pulse has a wavelength lying in a range between 100 nm and 20000 nm.

6. The method according to claim 1, wherein the second shorter laser pulse is a femtosecond laser pulse.

7. The method according to claim 1, wherein a polarization of the carrier laser pulse is rotated during the interaction with the second shorter laser pulse, wherein the interaction with the second shorter laser pulse results in a sudden polarization change of the carrier laser pulse, wherein the polarization change is transferred to an intensity change by using a polarizer.

8. The method according to claim 1, wherein the first non-linear material and the second non-linear material are independently from each other chosen from the group consisting of sapphire, YAG, water, $CaF_2$, $BaF_2$, $YVO_4$, LiF, $Al_2O_3$, $SiO_2$, KDP, BBO, KTP, $BK_7$, KTA, KGW, ZnS, $AgGaS_2$, MgO, and ZnSe.

9. The method according to claim 1, wherein the supercontinuum has a negative chirp.

10. The method according to claim 1, wherein the supercontinuum has a negative chirp in a central spectral range of the supercontinuum around a frequency of the carrier laser pulse.

11. The method according to claim 1, wherein the center frequency of the supercontinuum is around the central frequency of the carrier laser pulse.

12. The method according to claim 1, wherein more than one ghost pulse is introduced into the carrier laser pulse.

13. The method according to claim 12, wherein the individual ghost pulses introduced into the carrier laser pulse differ in at least one of a spectral position of the carrier laser pulse, an intensity profile of the ghost pulses, and the third temporal width of the ghost pulses.

14. An arrangement for generating a supercontinuum, the arrangement comprising a first laser source for emitting a first laser pulse, a first non-linear material arranged with respect to the first laser source such that a first laser pulse emitted by the first laser source is radiated onto the first non-linear material, a processor, and a memory device,
   wherein the memory device comprises a computer-readable program that, when executed on the processor, causes the processor to carry out a method according to claim 1, wherein the method comprises the following steps:
   a) radiating a carrier laser pulse having a first temporal width onto a first non-linear material,
   b) at the same time, radiating a second shorter laser pulse having a second temporal width and a second bandwidth onto the first non-linear material, wherein the first bandwidth is smaller than the second bandwidth, thereby changing the non-linear properties of the first non-linear material, transferring bandwidth from the second shorter laser pulse to the carrier laser pulse, and imprinting a ghost pulse having a third temporal width into the carrier pulse; the second temporal width being at least two times shorter than the first temporal width, and c) radiating the carrier laser pulse with imprinted ghost pulse onto the first non-linear material or a second non-linear material and generating, by self-phase modulating, a supercontinuum around the center frequency of the carrier pulse.

15. The arrangement according to claim 14, wherein the arrangement further comprises a second laser source as well as a delay line, wherein the second laser source serves for emitting the second shorter laser pulse, wherein the delay line comprises a mechanically movable set of mirrors.

* * * * *